United States Patent [19]

Taylor

[11] Patent Number: 6,080,968
[45] Date of Patent: Jun. 27, 2000

[54] LIQUID HEATING VESSELS

[75] Inventor: John Crawshaw Taylor, Castletown, United Kingdom

[73] Assignee: Strix Limited, Ronaldsway, United Kingdom

[21] Appl. No.: 08/750,345

[22] PCT Filed: Jun. 9, 1995

[86] PCT No.: PCT/GB95/01342

§ 371 Date: Dec. 6, 1996

§ 102(e) Date: Dec. 6, 1996

[87] PCT Pub. No.: WO95/34187

PCT Pub. Date: Dec. 14, 1995

[30] Foreign Application Priority Data

Jun. 9, 1994 [GB] United Kingdom .................... 9411573
Oct. 7, 1994 [GB] United Kingdom .................... 9420237

[51] Int. Cl.[7] .............................. H05B 1/02; A47F 31/56
[52] U.S. Cl. .......................... 219/441; 219/432; 219/438; 99/323.3
[58] Field of Search .................... 219/429, 432, 219/435, 436, 437, 438, 444, 449; 99/281, 293, 323.3; 337/367

[56] References Cited

U.S. PATENT DOCUMENTS

| | | | |
|---|---|---|---|
| 2,924,698 | 2/1960 | Jepson | 219/441 |
| 3,678,246 | 7/1972 | Blachly et al. | 219/437 |
| 3,915,079 | 10/1975 | Balderson | 99/281 |
| 4,523,173 | 6/1985 | Phillips et al. | 337/367 |
| 4,539,468 | 9/1985 | Phillips et al. | 219/437 |
| 4,621,186 | 11/1986 | Taylor et al. | 219/437 |
| 4,645,910 | 2/1987 | Chhatwal | 219/437 |
| 4,697,068 | 9/1987 | Schreder | 219/449 |
| 4,752,671 | 6/1988 | Foster et al. | 219/437 |
| 4,812,623 | 3/1989 | Haden et al. | 219/437 |
| 4,982,654 | 1/1991 | Bourgeois | 99/323.3 |

FOREIGN PATENT DOCUMENTS

| | | |
|---|---|---|
| 2042857 | 9/1980 | United Kingdom . |
| 2149217 | 6/1985 | United Kingdom . |
| 2236220 | 3/1991 | United Kingdom . |
| 2251986 | 7/1992 | United Kingdom . |
| WO 94/06185 | 3/1994 | WIPO . |

*Primary Examiner*—Jospeh Pelham
*Attorney, Agent, or Firm*—Testa, Hurwitz & Thibeault, LLP

[57] ABSTRACT

A control for engagement with the external base of a liquid heating vessel comprises a carrier mounting two bimetallic actuators at opposite ends thereof. The actuators operate at the same temperature. Attached to the carrier is a moulding which provides a cordless electrical connector for the vessel, as well as mounting switch means operable by the actuators through push rods. The push rod acts on a leaf spring to open the contacts, and upon further movement engages an arm of a trip lever, so tripping the lever and causing a further arm of the lever to engage the leaf spring open the contacts fully.

49 Claims, 15 Drawing Sheets

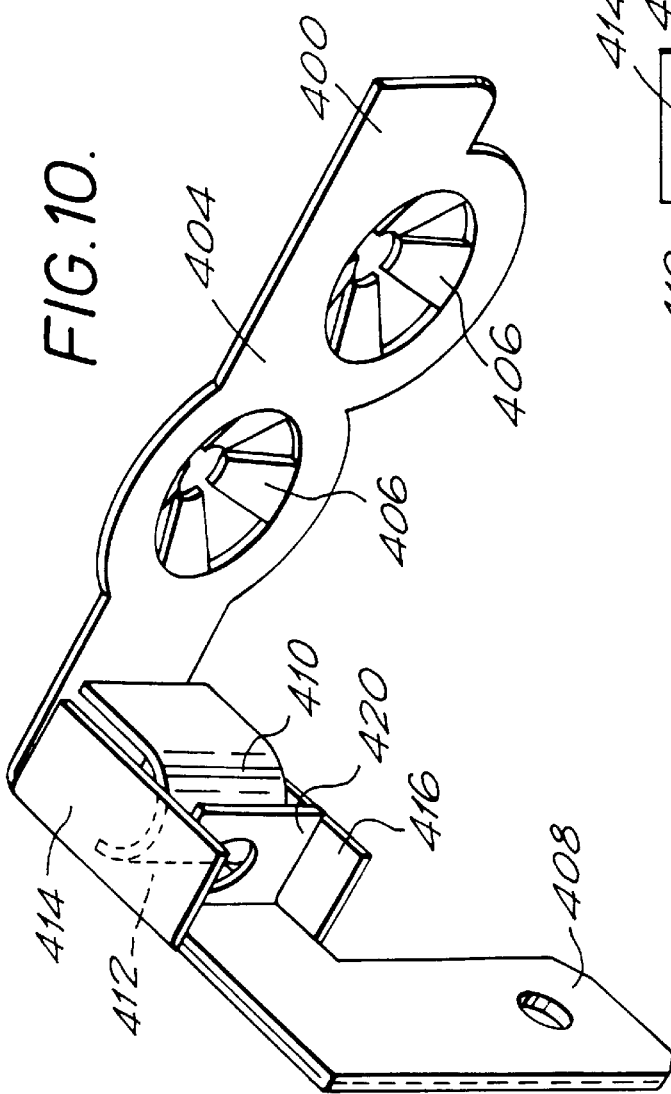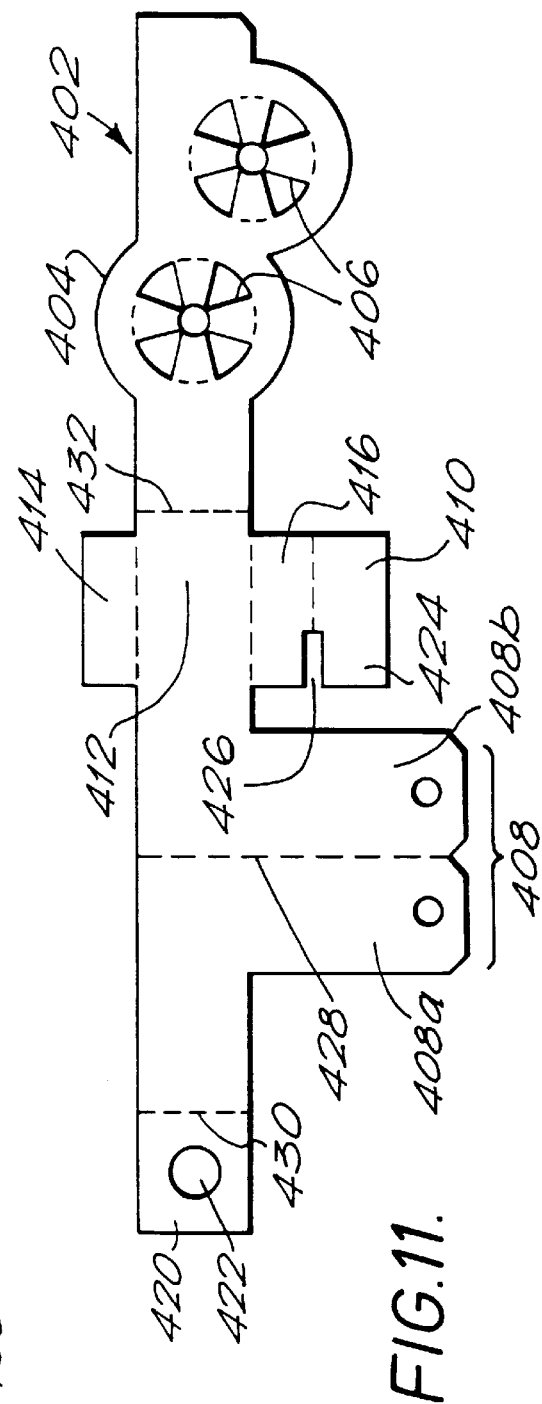

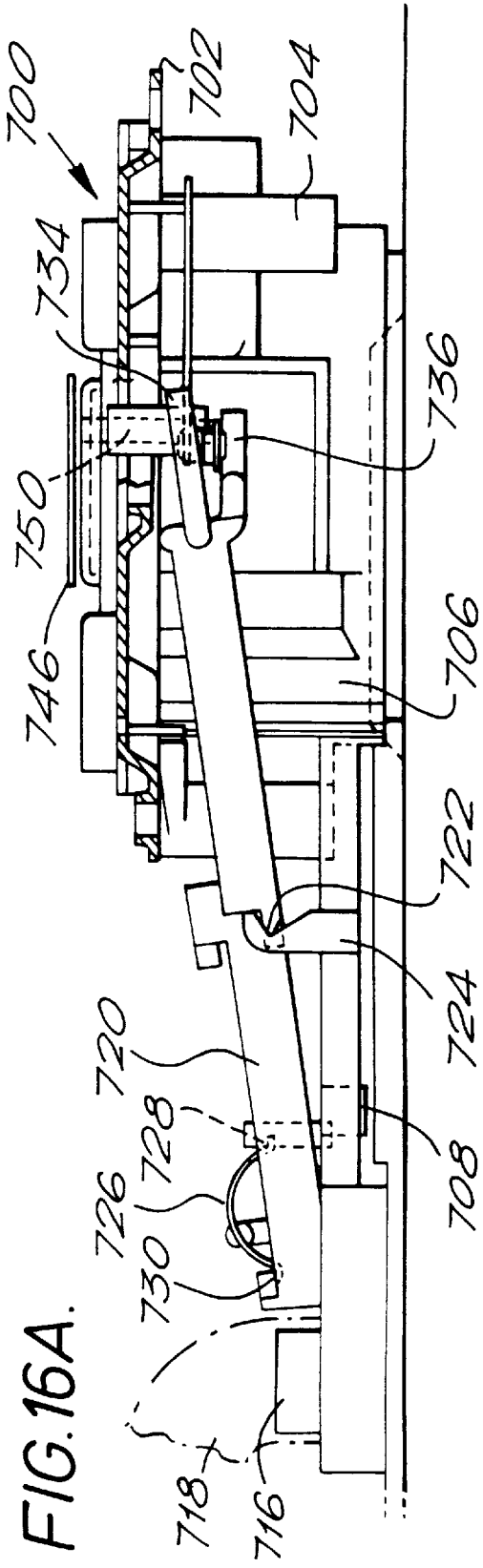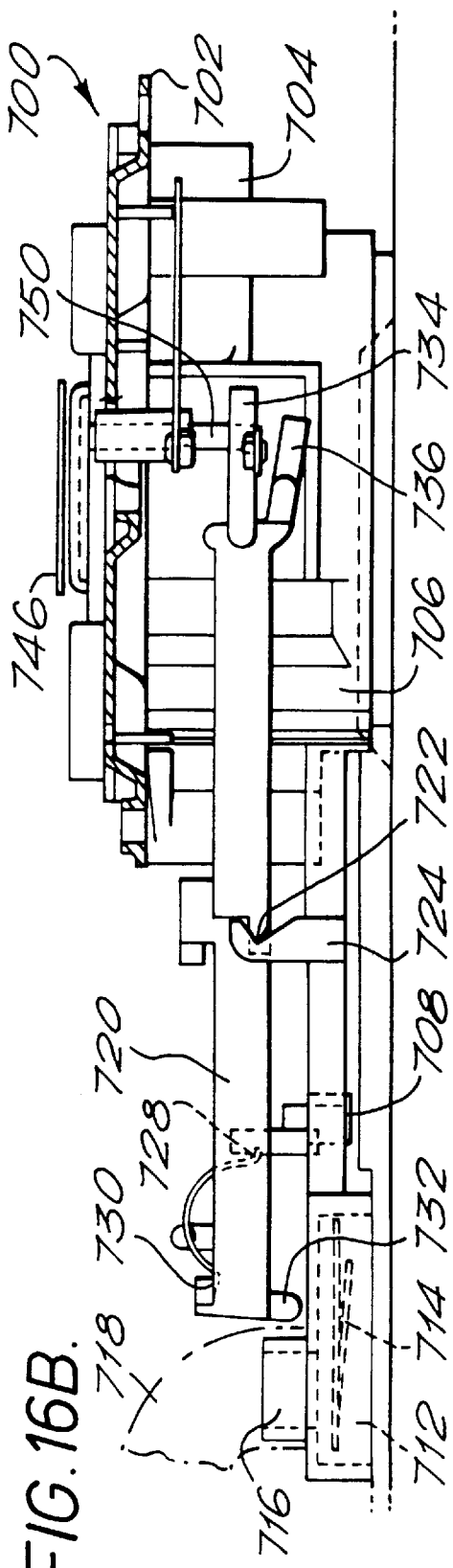

LIQUID HEATING VESSELS

The present invention relates to liquid heating vessels having electrical heating elements, and in particular in certain aspects to liquid heating vessels having a liquid receiving container and an electrical heating element secured in good thermal contact to the underside of the container. An example of such an arrangement is shown in GB-A-2042269.

Such types of vessel are popular in certain areas of the world, for example in continental Europe, for boiling water for making hot beverages such as tea and coffee. Typically, the liquid receiving container has a base portion at least which is made from a corrosion resistant metal such as stainless steel, which gives the interior of the vessel an attractive appearance and makes it easier to clean. The rest of the vessel may also be of this metal, but could possibly also be of for example a plastics material suitably joined to the base portion. The container conventionally has an external base plate made of a high thermal conductivity metal such as aluminium, to which the element is secured and through which heat is conducted into the container.

It has been common in such vessels to provide thermally sensitive overheat protection means in thermal contact with the element of the vessel which operates to interrupt or reduce the supply of electrical energy to the element in the event of the element overheating, as might happen if the vessel boils dry or if it is switched on without any liquid in it. Typically such overheat protection means comprises a thermally sensitive switch, mounted on the base plate of the vessel, which operates to open a set of contacts in the electrical supply to the element. The switch may, for example, comprise a bimetallic actuator, and be such as to reset automatically upon the container cooling down. Some vessels may also be provided with a one-shot device such as a thermal fuse arranged under the base, which senses a dangerous overheating of the vessel and must be replaced after it operates.

The problem with existing controls of this type is that the temperature of the container base, and thus indirectly the temperature of the element, is sensed effectively only at a single location on the base. Thus if, for example, the vessel is accidentally placed on a work surface so that its base slopes, it is possible that as the vessel boils dry one part of the bottom of the container may still be covered by water, but another be uncovered. This part of the base will therefore overheat first, and if the overheat protecting means is arranged under the part of the vessel base still covered with water, severe overheating of the element may occur locally, which is potentially very dangerous.

The invention from one aspect seeks to provide an improved vessel of the above type.

From a first aspect therefore, the invention provides a liquid heating vessel comprising: a liquid receiving container; an electrical heating element provided on or in thermal contact with the base of said container; a thermally sensitive overheat control arranged to operate in the event of said element overheating so as to interrupt or reduce the supply of electrical energy to the element; said thermally sensitive overheat control comprising at least two thermally responsive sensors arranged in good thermal contact with, and at spaced apart locations on, the base of the container or the element, said sensors individually being operable, in the event of said element overheating so as to interrupt or reduce the supply of electrical energy to the element.

Thus in accordance with the invention, at least two thermally responsive sensors are provided in close thermal contact with the base of the vessel container, which will allow the temperature of the base and element to be detected accurately at at least two spaced apart locations so that should the base or element overheat locally, at least one of the sensors may sense this quickly and operate to interrupt or reduce the power supply to the element, for example opening a set of electrical contacts remote from the sensor through suitable actuating means.

Preferably in order to achieve consistent operation of the control, the sensors are chosen to have substantially the same operating temperature characteristics. However, this is not essential, and one sensor may operate at a higher temperature than the other. This is not preferred, however, since depending on the location of the sensors, overheating of the vessel may occur in certain operating conditions.

To obtain optimal thermal transfer from the container base to the sensors, they are preferably mounted directly against the container base or element. Also, to obtain a good response, the sensors should be spaced apart by a substantial distance.

This is advantageous in that it will allow the depth of the base compartment to be minimised, thereby reducing the overall height of the vessel, contributing to the stability of the vessel and enhancing its appearance.

The term sensor as used above is intended to be interpreted broadly and may cover a number of different constructions. For example it may include electrical or electronic temperature sensors, but preferably the sensors comprise thermo-mechanical actuators, most preferably bimetallic actuators. Such actuators are well known in the art, and typically produce an actuating movement with a snap action upon reaching a predetermined temperature.

From a second aspect, the invention provides a thermally sensitive overheat control for mounting to the base of a liquid heating vessel and arranged to operate in the event of said element overheating so as to interrupt or reduce the supply of electrical energy to the element; said thermally sensitive overheat control comprising at least two thermally responsive bimetallic actuators mounted on a face of said control at laterally spaced apart locations thereon, for engagement with the base of the container or the element, said sensors individually being operable at substantially the same temperature so as, in the event of said element overheating, to operate to interrupt or reduce the supply of electrical energy to the element.

Preferably the control is manually or automatically resettable so that after operation it may be reset to allow re-use of the vessel. In one embodiment, the sensor or actuator may act to trip a spring loaded mechanism of the vessel which may be reset by a user. Preferably this mechanism is such that a user may switch the vessel off by tripping the mechanism, and it may comprise for example a lever arm connected to a control knob on the outside of the vessel.

In alternative embodiments, at least one of the actuators or sensors may be of a non-resettable type, for example fusible member, such as a plastics push rod, biased into thermal contact with the base of the vessel and which, in its solid condition maintains closed a sprung set of contacts. When the vessel base overheats the fusible member melts or thermally deforms so as to allow the contacts to open.

Preferably, only two sensors or actuators are provided, and to give optimum performance, these are preferably spaced apart through 180° around the vessel base.

Preferably the respective sensors or actuators operate to open sets of contacts in the respective poles of the supply to the element, giving double pole protection.

Although it would be possible to mount the sensors or actuators independently on the vessel base, in a preferred embodiment they are mounted on a common carrier which is mounted or located to the vessel base. Such an arrangement considerably facilitates assembly of the vessel. Furthermore, it allows a standard component to be used in a different number of embodiments.

The invention also extends to such an assembly and from a second aspect therefore provides a thermally sensitive control sub-assembly for mounting to the base of an electric liquid heating vessel comprising at least two thermally sensitive sensors mounted to a carrier member at spaced apart mounting locations thereon.

Preferably, the sensors are as described above, most preferably snap acting bimetallic actuators, for example such as those disclosed in GB 1542252. These produce a snap action movement when reaching a predetermined temperature, which may then be used either directly or indirectly to open a set of electrical contacts. The movement of the actuators may be transmitted to the contacts via slidable push rods, for example, or respective pivot members, which may be mounted on the carrier so as to cooperate with their respective actuators.

The actuators are preferably mounted on the same surface of the carrier to allow them easily to be positioned in good thermal contact with the vessel base.

As stated above, preferably only two actuators are provided, most preferably spaced apart by substantially 180°. These actuators may therefore be mounted at opposite ends of the carrier, which gives good spatial separation of the actuators and also facilitates good thermal contact with the element of the vessel, particularly when the element is an annular element, the carrier being mounted within the annulus. In such an arrangement, the actuators may then be positioned in close thermal contact with the inner diameter of element, thereby more accurately sensing the temperature of the element and improving the operation of the control.

The carrier is preferably metallic, for example steel, and most preferably is a metal plate member. This gives a strong, inexpensive, construction which is both temperature resistant and which can, if required, be metallurgically joined to the base of the vessel by welding for example. Alternatively, mounting means such as screws, studs, bosses or the like may be provided on the base to retain the carrier. In a further arrangement, the carrier may be retained by deforming or crimping a portion of the vessel base, or the element, over an edge of the carrier or even to deform a portion of the carrier itself, for example to engage in channels or clips provided on the base or element. This avoids the need for secondary operations on the base of the vessel to provide studs or bosses, thereby reducing manufacturing costs.

The carrier may also act to mount, or be integrated with other components, such as boiling controls or electrical connectors for the vessel, such as a "cordless" connector.

In one embodiment, a boiling control is included. The boiling control may comprise a thermally sensitive actuator such a bimetallic actuator, more particularly a snap-acting bimetallic actuator as described above, which is exposed in use to vapour produced in the vessel as the liquid boils. The vapour is conveniently directed onto the actuator by a pipe leading into the base compartment, for example through a passage extending from an aperture formed in an upper part of the vessel wall or through the vessel base.

The boiling control, or at least the actuator, thereof is preferably arranged spaced inwardly from the edge of the container, to provide a compact construction. From a yet further broad aspect, the invention provides a liquid heating vessel having a liquid receiving container, electrical heating means provided on or in thermal contact with a bottom surface of said container, and a manually resettable boiling control arranged in a compartment below said container and spaced inwardly from the edge thereof, and means for directing vapour from said vessel to said control.

Preferably vapour is directed to the steam control by a flexible pipe which engages with a steam outlet of the vessel, for example the outlet of a pipe extending through the base of the vessel or along a side of the vessel. Such an arrangement is advantageous since it allows vapour to be directed to the precise area required, allows tolerances to be taken up between the vessel steam outlet and the control and also allows the steam easily to be conducted through a tortuous path, if required.

From a further aspect, therefore, the invention provides a liquid heating vessel comprising a boiling control located beneath the base of the vessel, vapour from the interior of the vessel being conducted to the control through a flexible pipe mounted to a vapour outlet of said vessel.

From a yet further aspect the invention provides a liquid heating vessel comprising: a liquid receiving container; an electrical heating element provided on or in thermal contact with a base of said container; a thermally sensitive overheat control arranged to operate in the event of said element overheating so as to interrupt or reduce the supply of electrical energy to the element; and a manually-resettable boiling control operable to interrupt the supply of electrical energy in the event of liquid in said vessel boiling; said overheat and boiling controls being located in a compartment arranged below, and substantially within the footprint of the vessel.

The steam-sensitive actuator may be mounted to the carrier and operate to open a set of contacts in the power supply to the element in response to liquid in the vessel boiling. The steam-sensitive actuator may, for example be mounted on an arm mounted to the carrier which, if required may be angled to pass over or under the element of the vessel.

Preferably the steam-sensitive actuator is horizontally arranged, and it may in certain embodiments be arranged under a handle portion of the vessel.

Preferably the steam-sensitive actuator acts to trip a spring-loaded mechanism, such as an over-centre spring mechanism, to open the contacts. Preferably the spring-loaded mechanism acts to open the same contacts as those opened by the thermally sensitive control, for example through the pivot members or push rods previously discussed, so as to avoid the need for a further set of contacts. The mechanism must then be reset by a user when it is desired to reboil liquid in the vessel after liquid in it has boiled.

Preferably the carrier described above is integrated with, or mounts, electrical connector means for conducting electrical power to the element of the vessel. This could, for example comprise a connector block for receiving the wires from a fixed power lead, or a pin connector for engagement with a socket connector provided in the end of a disconnectable power lead. Most preferably, however, the carrier is integrated with a so-called "cordless" connector part which in use will engage with a complementary connector part in a base unit for the vessel.

From a yet further broad aspect, the invention provides a liquid heating vessel with a liquid receiving container and an electrical heating element mounted therein or externally thereof on, or in thermal contact with the base of said container, a cordless connector arranged generally centrally of the base, and a thermally sensitive sensor arranged laterally displaced from said connector in a base compartment of the vessel, in thermal contact with the base of the vessel.

The invention also extends to an assembly comprising a cordless electrical connector mounted on a carrier member, said carrier member also mounting at least one thermally sensitive sensor at a location laterally offset from the axis of said connector. Most preferably, the connector is of a type, as described for example in our International Patent Application No. WO 95/08204, which can be engaged with a base connector irrespective of their relative angular orientations.

Preferably the connector is arranged between a pair of actuators on the carrier, so that it can easily be arranged centrally of the base of the vessel.

Preferably the connector comprises an electrically insulating plastics moulding mounting a plurality of concentric terminal members. In one embodiment, the moulding may be secured to the carrier by means of the earth terminal of the connector. This not only provides an earth connector to the base of the vessel through the carrier, but also obviates the need for additional mounting components, thereby reducing production costs. In such an embodiment, the earth terminal may be a ring member provided with mounting lugs extending from one end thereof for extending in use from the moulding for engagement with mounting openings or slots in the carrier. These lugs may be turned down to secure the connector to the carrier. Alternatively, separate mounting means may be provided on the carrier.

Preferably the moulding also mounts one or more sets of switch contacts openable by the thermally sensitive actuators. In one arrangement, a leaf spring is connected to a respective terminal of the connector and provides, or mounts, a movable contact of a contact pair, which may be resiliently deflected by a push rod or pivot member previously discussed.

This in itself is a novel arrangement, and from a further aspect, therefore, the invention provides a cordless electrical connector in or for a electrical appliance said connector having an electrically conductive strip connected to a terminal of the connector, said strip providing or mounting an electrical switch contact.

A fixed contact of the contact pair may also be provided on a further member mounted in or to the moulding, that further member preferably having connector means, such as a spade connector, for connection to a terminal of the element.

In this way a completely integrated connector and control may be provided which simply requires mounting to the base of the vessel and electrical connection to the terminals of the element.

The connection provided on the member for connection to the element terminal may, as stated above comprise a spade terminal. However to allow different constructional methods to be accommodated, it may also comprise a means to receive a connection wire without the need for soldering or for providing a spade on the wire.

The invention is also applicable to 'corded' applications, wherein the vessel comprises a pin inlet in a side wall of the vessel, electrical power being conducted to the thermally sensitive switch means by suitable electrical conductors. In view of the high operating temperatures which may be experienced in the base compartment, particularly close to the element, it is preferred that such conductors are conductive strips rather than plastics coated wires which might sag or melt in practice. This in itself is a novel arrangement and from a yet further aspect, therefore, the invention provides a liquid heating vessel having a liquid receiving container and an electrical heating element mounted on or in thermal contact with the underside of said container, a base compartment below said container and housing switch means of a control of the vessel, plug means having terminals for connection to an external electrical supply, and communicating with the interior of the base compartment, said terminals being connected to said switch means by electrically conductive strips extending laterally therefrom through the base compartment.

The strips may themselves act as, or mount, a switch contact.

As stated above, the switch contacts of the control of the invention may be fully opened by a spring loaded trip lever mechanism.

Preferably the trip lever is mounted to a moulding mounted to the carrier plate. A different moulding may be used for different applications, for example corded and cordless applications.

Preferably the trip lever is configured so that when one or other of the actuators of the control operates, a first arm of the lever will be picked up by a contact or contact mounting member, so as to trip the mechanism and thereafter a further arm operates on the contact or contact mounting member to open the contacts fully.

In one embodiment, a steam sensitive bimetallic actuator may also be provided on or in the moulding and also act to trip the lever to open the switch contacts.

A manually operable lever may extend from the trip lever outside the vessel for operation by a user to either trip the mechanism to switch the vessel off or to reset it once the contact has operated. Preferably, however, two operating levers are provided which in corded applications may be on either side of the electrical inlet to the vessel. This in itself is a novel arrangement and will allow for right-handed and left-handed operating of a vessel, so from a yet further aspect, the invention provides a liquid heating vessel comprising an electrical heating element, a spring loaded mechanism tripped by operation of a thermally sensitive or steam sensitive control of the vessel, and a pair of levers coupled to said mechanism and extending side-by-side outside said vessel for operation by a user to reset the mechanism after operation of the control.

As discussed earlier, the preferred element used with the control of the present invention is annular, the thermally sensitive control being arranged radially inside the element. In present constructions of liquid heating vessels, it is normal to provide the element on an aluminium plate which is secured to and extends substantially completely across the base of the vessel. Furthermore, the element is usually coiled so as to cover over 360° of the base. The result is that, firstly, a large amount of aluminium is used and, secondly, the heating effect is spread across a large proportion of the vessel base resulting in a low watts density. When liquid in the vessel boils, this results in a foaming boil over a large area of the vessel base which not only can be selected from the vessel spout and might lift the lid off the vessel. Similarly it also produces less steam for sensing by a steam control. What is required is a high watts density for producing convection within the vessel to produce large steam bubbles. This can be achieved by providing a vessel with an element extending through less than 360° on its base.

From a yet further aspect therefore, the invention provides a liquid heating vessel comprising a liquid receiving container, an electrical heating element arranged below, but in thermal contact with the container, and a vapour sensitive control operative in the event of liquid boiling in the vessel to interrupt the supply of electrical energy to the element, said element being annular and extending through less than 360° over the base of the container.

Preferably the element is pre-mounted or embedded in an aluminium ring which is then joined to the container base for example, by friction welding. This reduces the amount of aluminium used and also concentrates the heating effect in certain areas of the base.

From a yet further aspect of the invention provides an annular electric heating element for mounting to the base of a liquid heating vessel, said element being embedded in, or mounted to an annular aluminium support member. This allows a pre-produced element to be mounted to a vessel base without the need for further operations to be performed on the element once it is positioned on the base.

Whilst it is known to friction weld aluminium base plates to liquid heating vessels, a further technique may be particularly suitable for this. In accordance with a yet further aspect of the invention there is provided a method of joining an aluminium member to the base of a liquid containing vessel comprising the steps of subjecting the surface of the vessel base to electron beam texturing in the area to receive the said member, and then pressing said member onto said base.

In electron beam texturing, a beam of electrons is fired at the surface to produce very small 'pocks' in the surface. It has been found that these pocks have a re-entrant profile, that is, they increase in area away from the surface being treated. This can provide, therefore, a particularly good key for an aluminium member which can be pressed onto the base at very high pressure so as to flow into the pocks and be retained thereby.

Some preferred embodiments of the invention will now be described by way of example with reference to the accompanying drawings in which:

FIG. 10 shows a terminal in accordance with the invention;

FIG. 11 shows the strip from which the terminal of FIG. 10 is produced;

FIGS. 16A and 16B show schematic side views of the embodiment of FIG. 15 in different operating conditions;

Figure 1:
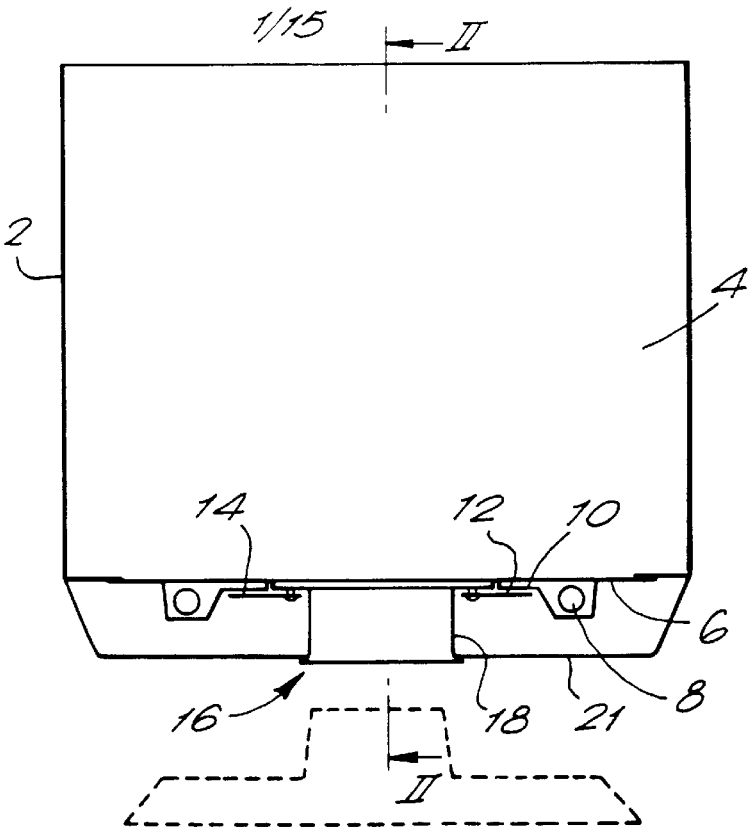
FIG. 1 is a schematic sectional view through a liquid heating vessel in accordance with the invention.
Figure 2:
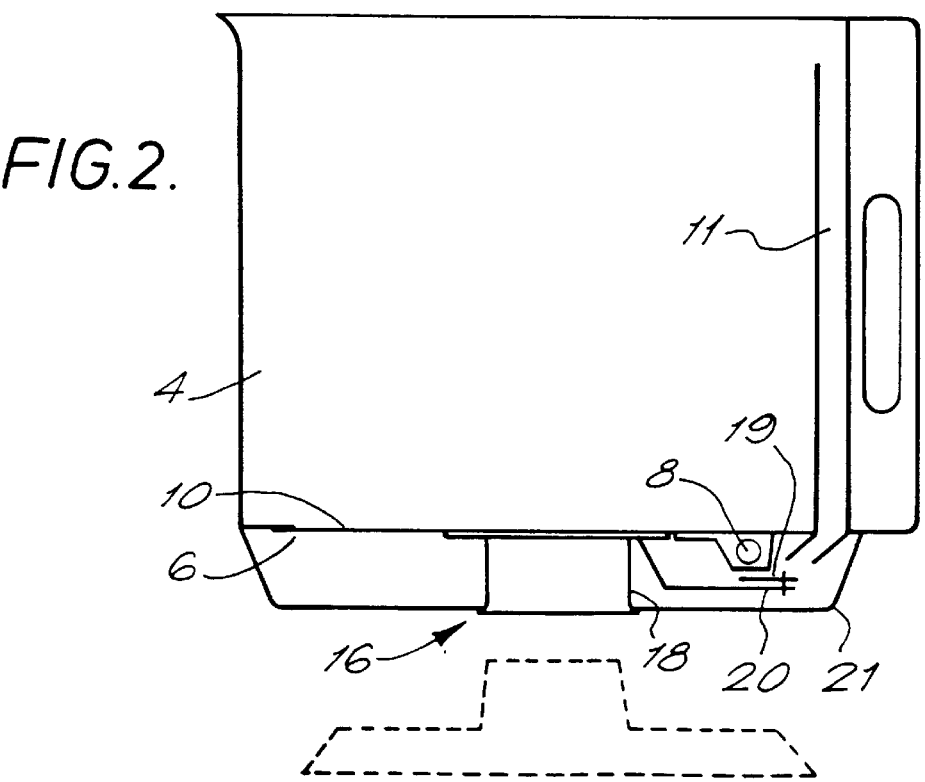
FIG. 2 is a schematic sectional view along line II—II of FIG. 1.

With reference to FIGS. 1 and 2 these show a cordless water boiling vessel 2. The vessel 2 comprises a liquid receiving container of stainless steel, to the bottom of which is attached an aluminium ring 6 having a coiled electrical heating element 8 of known construction. The ring 6 is secured to the bottom of the vessel 4 by friction welding or some other suitable method. For example the bottom of the vessel may be pre-treated by electron beam texturing and the aluminium then pressed onto that part of the vessel bottom.

The element extends around the base for less than 360° and is embedded in the aluminium ring 6. The aluminium ring 6 has an radially inwardly projecting flange 10, against which the bimetallic actuators 12, 14 of a thermally sensitive control sub-assembly 16 engage.

The control sub-assembly 16 is integrated with a cordless electrical connector 18 for the vessel into an integrated unit 19 and is also provided with a steam control 20 as shown schematically in FIG. 2. The base of the vessel is also provided with a cover 21.

The unit 19 will now be described in greater detail with reference to FIGS. 3 to 9.

The basic component of the control sub-assembly 16 is a carrier plate 22 which is a pressed steel component. The carrier plate 22 has two side projections having pairs of arms 24, 26 provided with mounting locations 28, 30 for snap-acting bimetallic actuators 12, 14, only one of which is shown in the figures for reasons of clarity. These actuators are bimetallic actuators of the type described in UK Patent 1542252, and are generally circular, domed and have a centrally released tongue 32. Upon reaching a predetermined temperature the actuator reverses its curvature with a snap action thereby producing an actuating movement. Both actuators are chosen so as to have substantially similar operating characteristics, say operating at 120° C.

The mounting locations 28, 30 for the respective actuators 12, 14 each have a mounting hole 34, 36 to receive a rivet or the like which extends through the tongue 32 of the actuator 12, 14 to secure it in position.

The actuating movements of the bimetallic actuators 12, 14 opens respective sets of electrical contacts in the supply to the element of the vessel through respective pivot members 38 which are mounted in bearings 40 provided in upstands 42 of the carrier plate 22. Again only one is shown in the drawings for clarity. The pivot member 38 may be moulded plastics components, possibly a temperature resistant plastics material. Each pivot members 38 has a hook-like projection 41 which abuts a lip 42 of the bimetallic actuator 12 and which has a slot 44 for engagement with a movable contact of a contact pair as will be described further below. A further slot 45 is provided for engagement with an on/off trip lever in certain embodiments, as will be discussed in relation to FIGS. 8 and 9 below.

Figure 4:
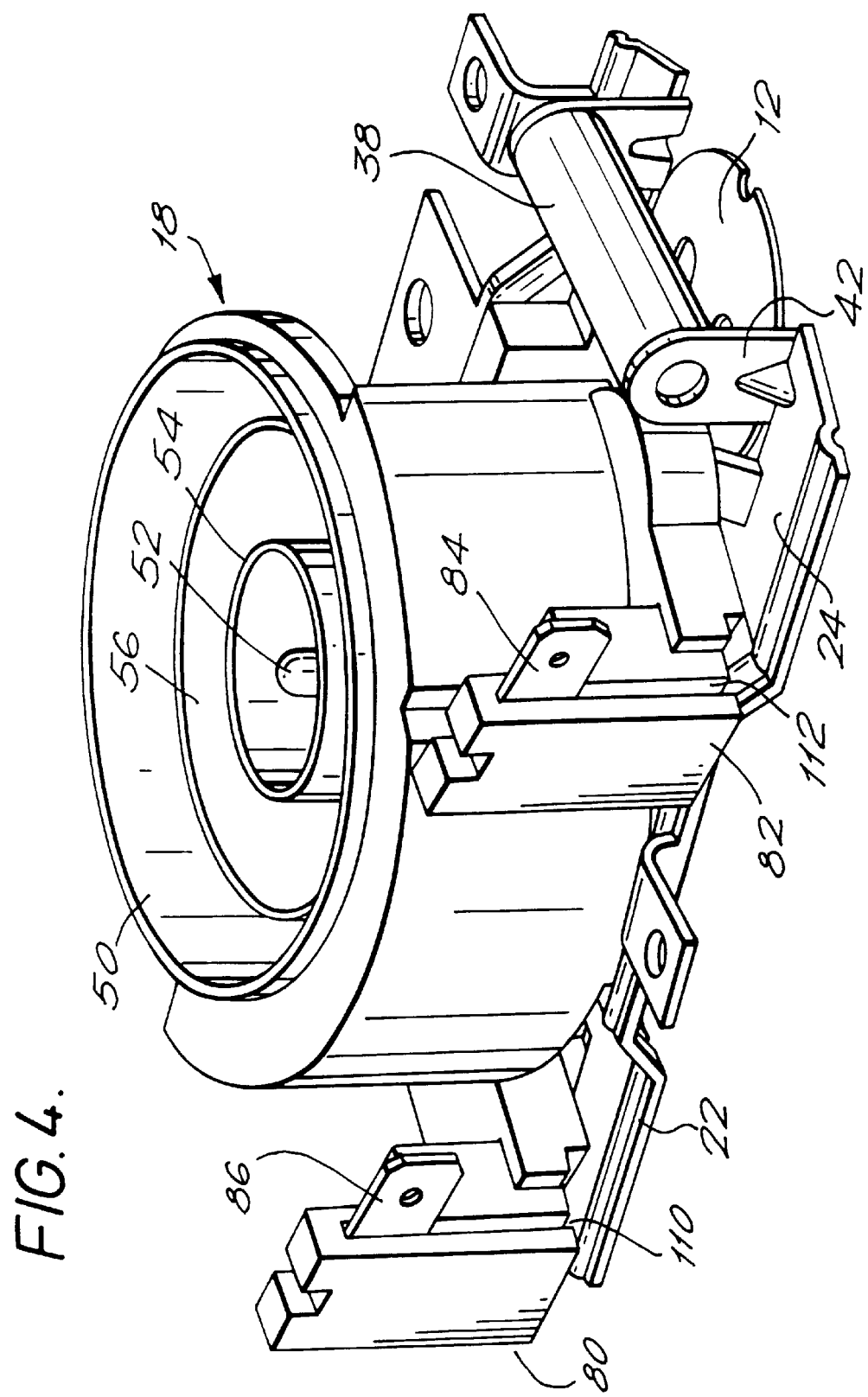
FIG. 4 shows the sub-assembly of FIG. 3 integrated with a cordless connector.
Figure 5:
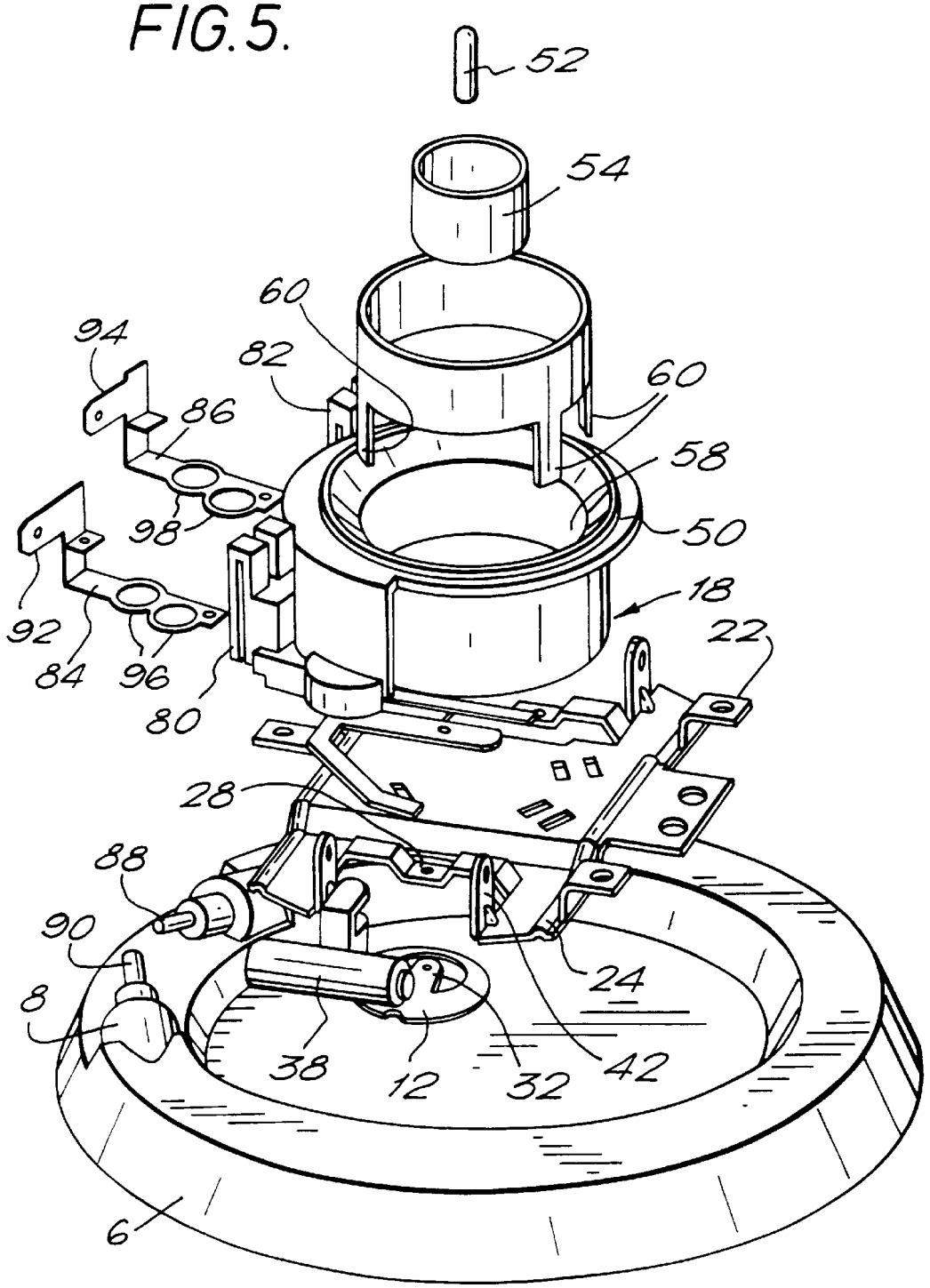
FIG. 5 shows the components of FIG. 4 exploded.
Figure 6:
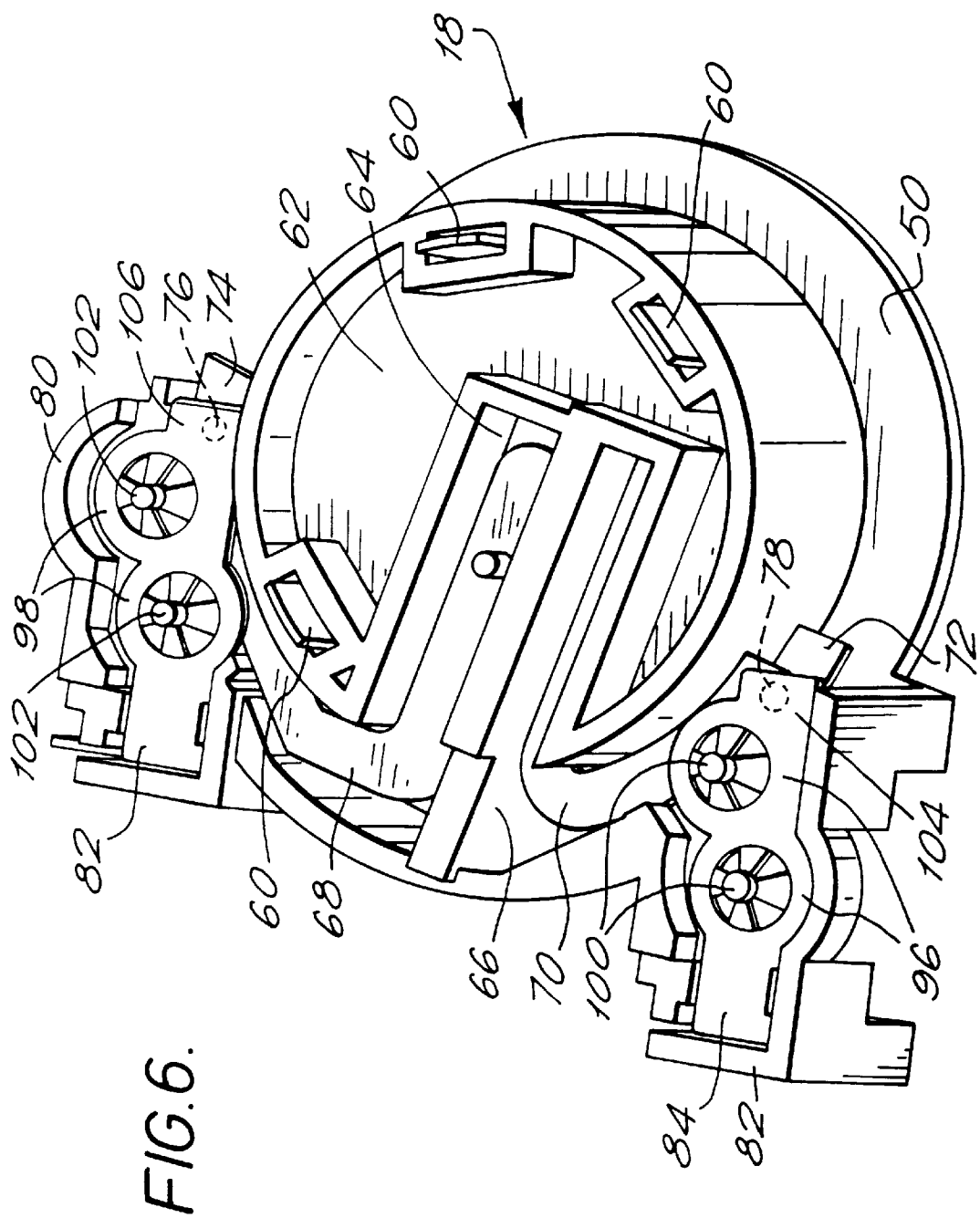
FIG. 6 shows a view on the bottom of the cordless connector of FIGS. 4 and 5.

The carrier plate 22 has also a number of lugs 44 which may serve as mounting locations for the carrier plate 22 on the base of the vessel. Alternatively, and more preferably, the carrier plate may be mounted to the base of the vessel at its edges by the aluminium ring being crimped over the plate at selected locations. FIG. 4. shows the carrier plate 22 integrated with a cordless connector 18 of the vessel. The connector 18 is of a type as disclosed in our International Patent Application No. PCT/GB94/02010, and is intended to engage with a complementary connector provided in a base unit upon which the vessel stands, irrespective of their relative angular orientation. As can be seen from FIGS. 5 and 6, it comprises a generally cup-shaped plastics moulding 50 inside which are mounted a central line pin 52 and an concentric annular neutral terminal 54. These are secured in the base 62 of the moulding 50. An annular earth terminal 56 is also provided, which lies against the inner circumferential wall 58 of the moulding 50. This terminal 56 has three lugs 60 extending from its upper end which extend through the base 62 of the moulding 50.

The base of the moulding 62, is formed with grooves 64, 66 which receive respective line and neutral terminal strips 68, 70 which make electrical connection with the pin 52 and ring 54 respectively. The ends 72, 74 of the strips 68, 70 mount electrical contacts 76, 78 and are not supported by the housing so that they may be resiliently deflected by the pivot members 38 as will be described further below.

The moulding 50 is also provided with two external pillars 80, 82 which mount respective terminal strips 84, 86 for connection to the terminals 88, 90 of the element. The terminal strips 84, 86 comprise spade connector portions 92, 94 and spring clips 96, 98 which engage over pillars 100, 102 in the housing to locate the strips in the moulding 50. The ends 104, 106 of the strips 84, 86 mount fixed electrical contacts (not shown), or may be silver plated for cooperation with the contacts 76, 78 provided on the ends of the terminal strips 68, 70. As can be seen from FIG. 4, the pillars 80, 82 have slots 110, 112 to allow the insertion of the terminal strips 84, 86.

The cordless connector 18, once assembled, is mounted to the carrier plate 22 through the lugs 60 of the earth terminal 66. These lugs 60, align with slots 120 provided in the carrier plates 22 and when inserted through the slots the ends of the lugs 60 are turned over to secure the connector 18 in place, as well as providing a earth contact to the vessel base.

When assembled, the slots 44 in the pivot member 38 engages with the free ends 72, 74 of the line and neutral strip terminals 74 respectively. As can be seen from FIG. 7, the whole assembly can then be mounted to the base plate of a the vessel. In the embodiment shown in FIG. 7, the heating element 8 is mounted in a aluminium plate 6 which extends substantially completely across the base of the vessel. The actuators 12, 14 are located at the extremities of the carrier plate 22 so as to be positioned closely adjacent the element 8 and thereby be particularly responsive to the temperature of the element.

In operation, if the vessel 2 should boil dry or be turned on without water in it, the base of the vessel and the element 8 will begin to overheat. The rise in temperature will be sensed by the actuators 12, 14 and when they reach their operating temperature, one or both of them will reverse their curvature, so as to pivot a respective pivot member 38 which will lift the respective leaf spring end 72, 74, thereby opening the contacts in one or both poles of the electrical supply to the element. When the element vessel cools by a predetermined amount, the actuators 12, 14 will reverse their curvature which will allow the contacts to remake under the resilience of the leaf springs 68, 70 thereby re-connecting the electrical supply to the element. This is thus an automatically resettable system which will cycle until turned off by a user.

Figure 3:
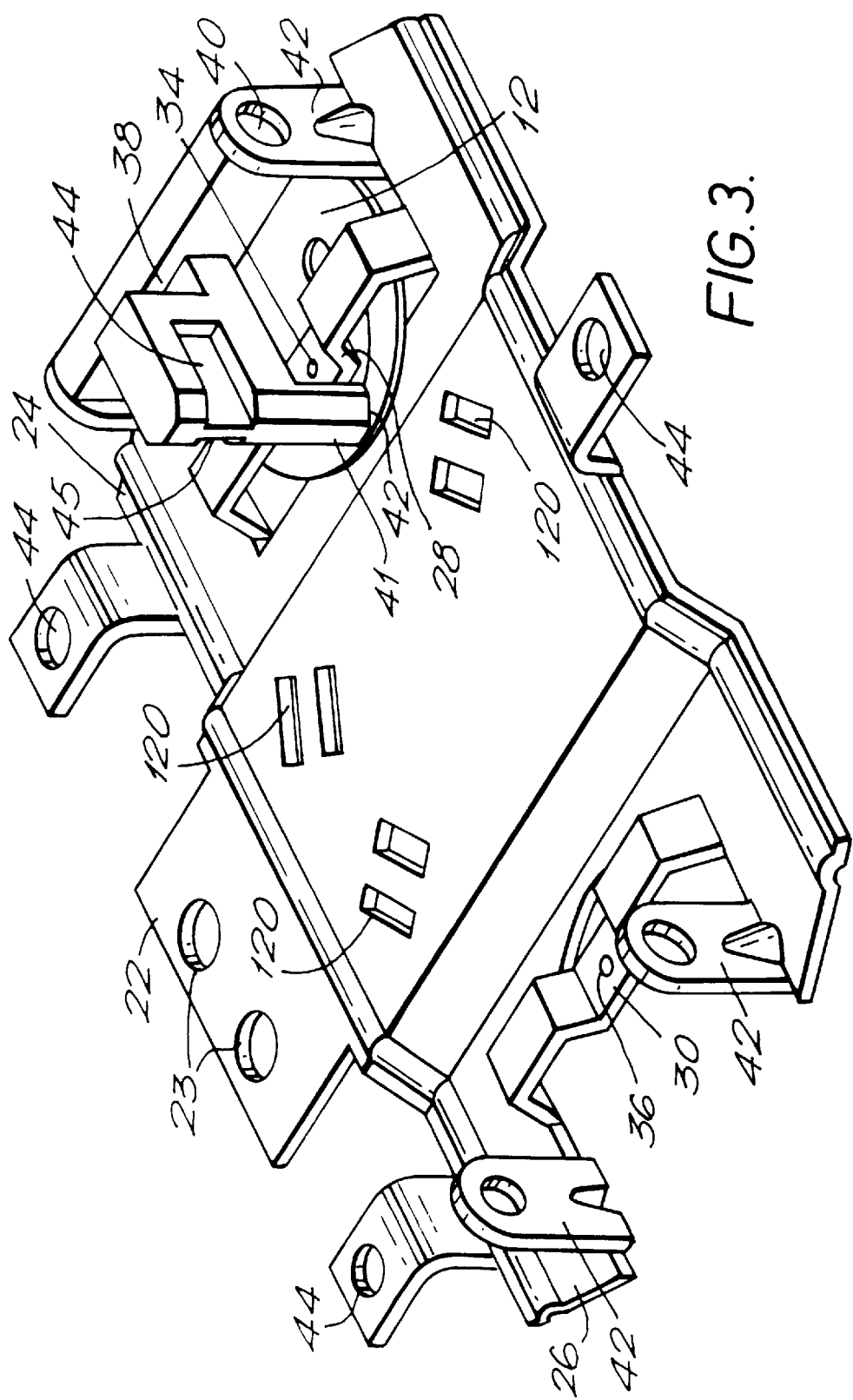
FIG. 3 shows a control sub-assembly in accordance with the invention.
Figure 7:
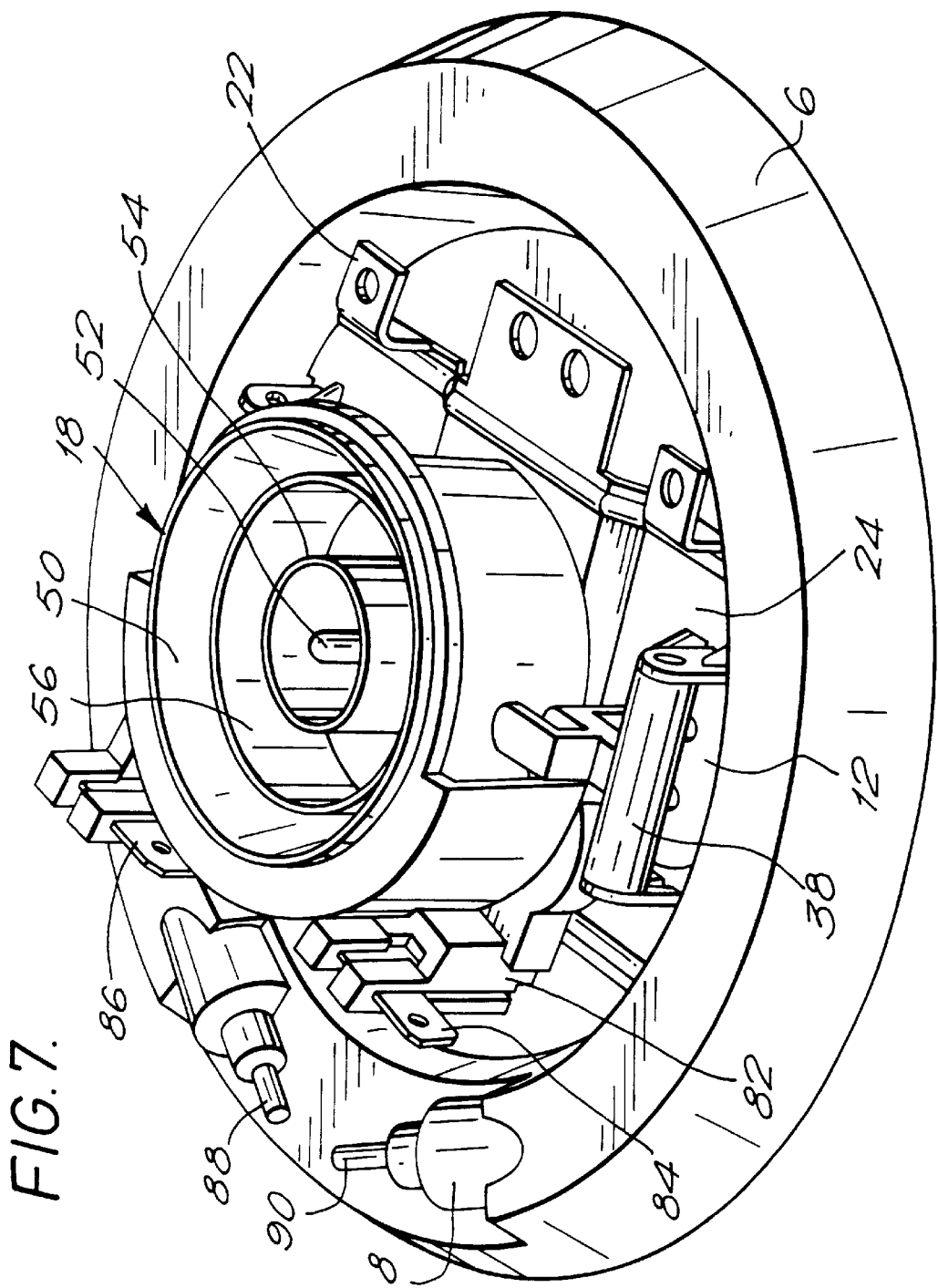
FIG. 7 shows the sub-assembly of FIGS. 4 to 6 mounted on a base plate of a vessel as seen from below.
Figure 8:
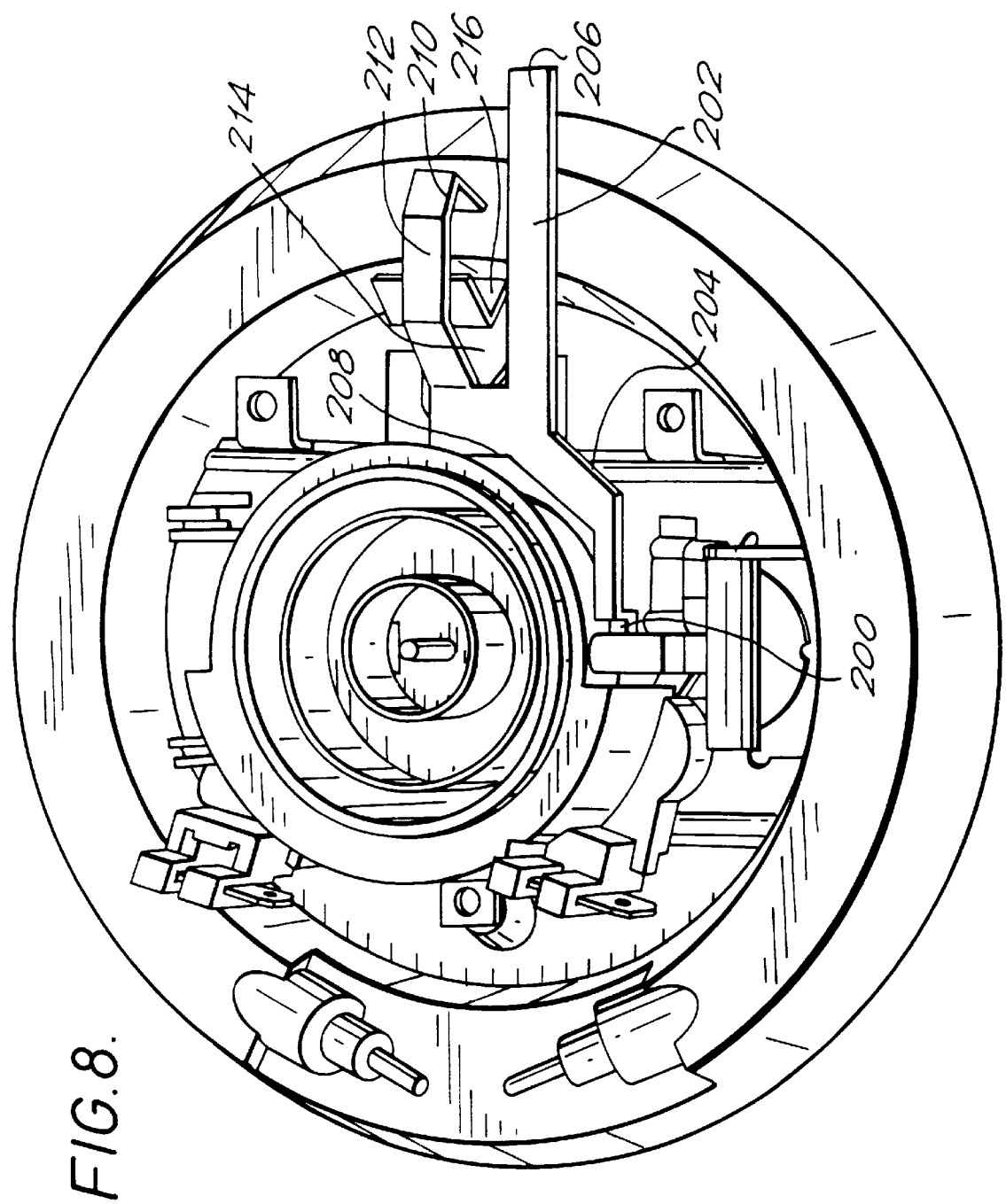
FIG. 8 shows an assembly of FIGS. 3 to 7 modified to accommodate a trip lever.

FIG. 8 shows an assembly as shown in FIGS. 2, 3 and 7 modified such that the actuators must be manually reset to re-connect the electrical supply to the element 8.

In this embodiment, one end 200 of a trip lever 202 engages in the slot 45 in the pivot member 38. Only half of the lever 202 is shown in the drawings for purposes of clarity, but it is arranged symmetrically around the cordless connector 18 and has two arms 204 the ends of which engage with the respective pivot member 38. The trip lever is pivotally mounted on the carrier plate 22 and has its other end 206 couple to a control knob extending from the base of the vessel for manipulation by a user.

The trip lever 202 is provided with a V notch 210 in a tongue 212 which receives one end of a C spring (not shown), the other end of which engages in a V notch 216 in a plate 214 mounted to the carrier plate 22 through mounting holes 23 therein (see FIG. 3). This provides a bi-stable over centre spring mechanism.

When a bimetallic actuator 12, 14 operates as described above, a pivot member 38 is lifted to the extent that it lifts an end 200 of the trip lever 202 to cause the spring mechanism to go over-centre thereby further moving the pivot member 38 with a snap action to open both contact sets. This gives a double pole disconnection, even though only one of the actuators 12, 14 may have operated. The trip lever 202 is stable in this position and the contacts cannot be re-closed until such time as a user resets the mechanism using the lever arm 204, regardless of the bimetallic actuators 12, 14 returning to their original configuration.

Figure 9:
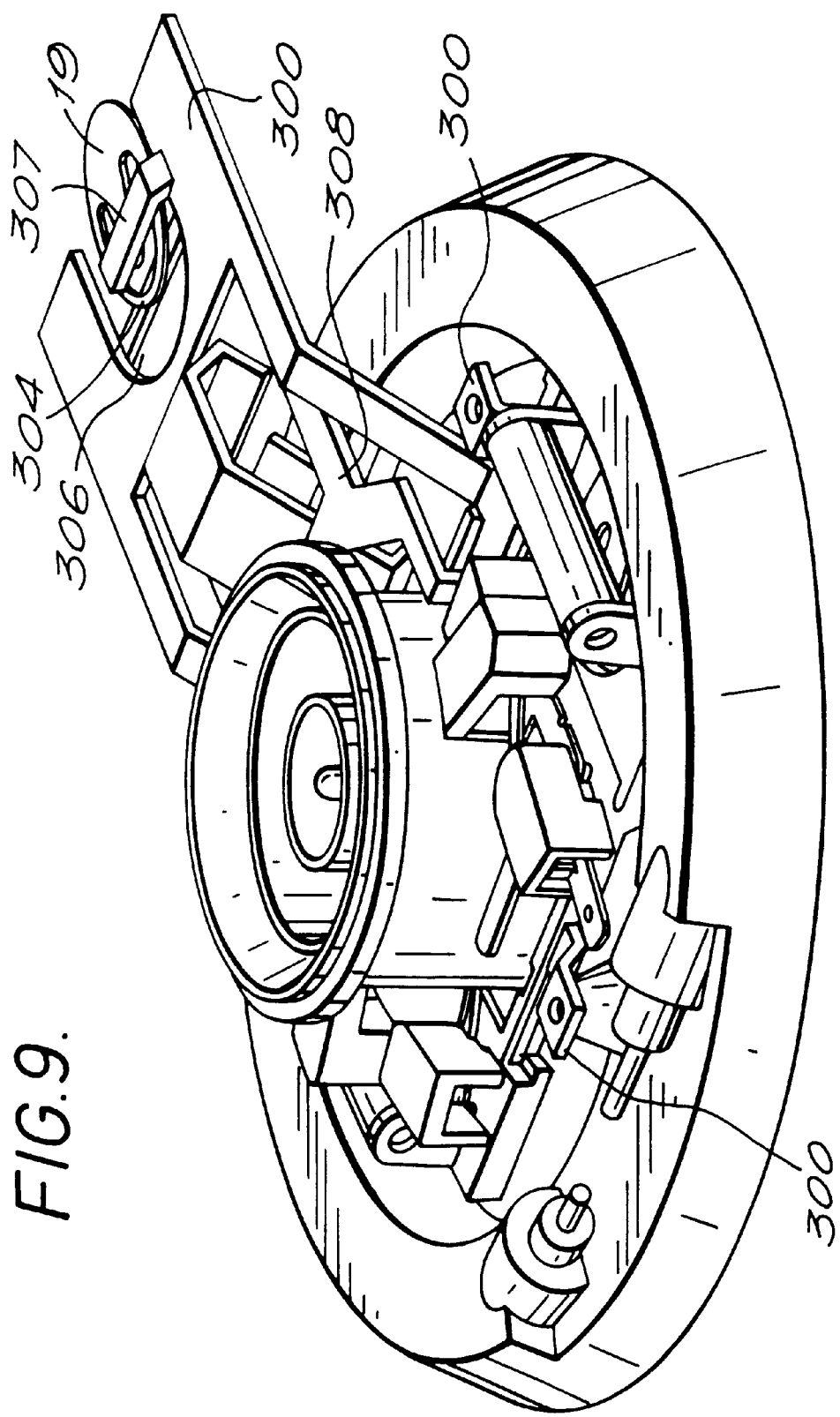
FIG. 9 shows a further modification to accommodate a steam control.

This construction may be further modified to incorporate a steam control, as shown schematically in FIG. 9. In this embodiment a mounting member 300 mounts a snap-acting bimetallic actuator 19 of a type as described earlier. The mounting member 300 is secured to the carrier plate 22 of the earlier embodiments and is in fact sandwiched between the connector 18 and the plate 22. A lip portion 304 of the actuator 19 overlies a cross-web 307 of a trip lever 308, which is mounted substantially as described in the previous embodiment. As can be seen schematically in FIG. 2 the actuator 19 is positioned below a steam passage 11 leading from the vessel, so that when liquid in the vessel boils, steam will be exhausted onto the actuator 19 which will reverse its curvature, thereby tripping the lever 308. This will cause both sets of contacts in the control to be opened, to disconnect the power to the element 8 and they cannot be reclosed, without a user re-setting the lever, as described above in relation to FIG. 8. The actuator 19 is positioned under the base of the vessel 4, spaced inwardly from the edge thereof.

As shown in FIGS. 1 and 2, the base plate need not extend or be embedded across the full face of the vessel, but instead, may be formed as an annular member. In this case as shown in FIG. 1, the bimetallic actuators 12, 14 are mounted in contact with an inwardly facing flange 10 of the aluminium ring for good thermal contact with the element. Such an arrangement saves a considerable amount of aluminium, and also produces a boil within the vessel which will more quickly be sensed by the actuator to turn the vessel off.

With reference to FIGS. 10 and 11, a preferred terminal 400 in accordance with the invention is formed from a blank 402 punched from 0.25 mm beryllium copper strip.

The terminal has an end 404 having two spring washers 406, which is intended to be supported in a moulding as previously discussed. The other end of the terminal is formed with a spade terminal 408 and a resilient tongue 410 which is biased back against the opposed floor portion 412 of the terminal end. The tongue is bounded above and below (in the sense of FIG. 10) by flaps 414, 416 folded up form the floor portion 412, and is attached along one edge to the flap 416. The tongue 410 is bounded at the front by a plate 420 with a hole 422 to allow access to the tongue 410. The tongue is bent back, as shown in FIG. 10, so as to engage resiliently the floor portion 412, so that a wire or the like may be inserted through the hole 422 and under the tongue 410 so as to be retained. The portion 424 adjacent the floor portion 412 is angled in the direction of introduction of the wire so that while it will allow deflection of the tongue as the wire is introduced, it will prevent the wire being withdrawn.

An exemplary method of construction of the terminal will now be described with reference to FIG. 11.

Firstly, tongue 410 has its end portion 424 bent back to provide the resilient portion for engagement with the floor portion 412. Then, the flaps 414 and 416 are folded up through 900 from the floor portion 412 of the blank. The blank is then folded through 180° along line 428 to form the double thickness spade terminal 400 from the two panels 408a, 408b. The plate 420 is then folded through 90° about the line 430 to its final position and finally the two ends of the blank are folded with respect to each other by 90° about the line 432.

Whilst the embodiments described above use actuators operable at substantially the same temperature, it would be possible, if so required to meet local safety regulations for example, to have one operate at a higher temperature than the other.

A further embodiment of the invention will now be described with reference to FIGS. 12, 13 and 14. This embodiment is similar to that shown in FIGS. 3 to 7, providing protection in the event only that the vessel boils dry or is switched on dry.

As in the earlier embodiment, this control 500 comprises a sub-assembly 502 which is integrated with a cordless electrical connector 504.

The basic component of the control sub-assembly 502 is a carrier plate 506 which is a pressed steel component. This plate 506 shown from below in FIG. 14 in more detail. The carrier plate 506 has two opposed mounting locations 508 for respective snap-acting bimetallic actuators 510, which are mounted to the side of the carrier plate 506 which is uppermost in use. These actuators are of the type described in relation to the earlier embodiments, and are chosen so as to have substantially similar operating characteristics.

The mounting locations 508, for the respective actuators each have a mounting hole 512 to receive a rivet or the like which extends through the tongue 514 of the actuator 510 to secure it in position. A window 516 is provided around each mounting location 508 to allow movement of the actuator to be transmitted through the plate 506.

The carrier plate 506 is integrated with a cordless connector 504 of the vessel. The carrier 506 is mounted on top of the connector, so as to lie between the base of the vessel and the connector. For clarity in FIG. 15 however, since the connector would be below and be obscured by the carrier 506, the position of the latter is shown in dotted lines. The connector 504 is generally similar to that described in FIGS. 2 to 9, comprising a generally cup-shaped plastics moulding 518 inside which are mounted a central line pin 520 and an concentric annular neutral terminal 522. These are secured in the base 524 of the moulding 518. An annular earth terminal 526 is also provided, which lies against an inner circumferential wall of the moulding 518. The moulding is provided with opposed moulded bores 528, which each slidably receive a push rod 530. The bores 528, are positioned so that the push rod 530 will align with a movable portion of its respective actuator 510.

The moulding 518 is formed on its upper surface with grooves 532, 534 which receive respective line and neutral terminal strips 536, 538 which make electrical connection with and are riveted to the line pin 520 and neutral ring 522 respectively. Unlike the earlier embodiment, however, the strips 536, 538 extend straight out over an edge of the moulding 518. The ends 540, 542 of the strips 536, 538 mount movable electrical contacts 544, 546 and are not supported by the housing so that they may be resiliently deflected by the push rods 530 as will be described further below.

The moulding 518 is also provided with two mounts 548, 550 for respective terminals 552, 554 for connection to the terminals of the element. The terminals 552, 554 comprise spade connector portions 556, 558 and push in connector parts 560, 562 to allow flexibility in the manner of connection to the element. The ends of the terminals 552, 554 mount fixed electrical contacts 564, 566, or may be silver plated, and cooperate with the movable contacts 544, 546. As will be seen in FIG. 13, the fixed contacts 564, 566 are arranged above the movable contacts 544, 546.

The cordless connector 504, once assembled, is mounted to the carrier plate 506 by passing lugs 570 provided on the carrier through openings 572 provided in the moulding and turning over the ends of the lugs to secure the plate 506 and 504 connector together.

The whole assembly is mounted to a vessel base in a similar manner to the earlier embodiment through mounting holes 574 on the carrier 506, so that the actuators 510 are in good thermal contact with the base of the vessel. A variety of mounting holes 574 may be provided on the corner to allow for flexibility in mounting locations and arrangements. The mounting is such that the cordless connector lies substantially centrally of the vessel base.

In operation, if the vessel should boil dry or be turned on without water in it, the base of the vessel and the element will begin to overheat. The rise in temperature will be sensed by the actuators 510 and when they reach their operating temperature, one or both of them will reverse their curvature, so as to move its respective push rod 530 downwardly in the sense of FIG. 13. This will push the respective leaf spring end 540, 542 downwardly, thereby opening the contacts in one or both poles of the electrical supply to the element. When the element vessel cools by a predetermined amount, the actuators 510 will reverse their curvature which will allow the contacts to remake under the resilience of the leaf springs 536, 538 thereby re-connecting the electrical supply to the element- This is thus an automatically resettable system which will cycle until the power to the vessel is turned off by a user.

Figure 15:
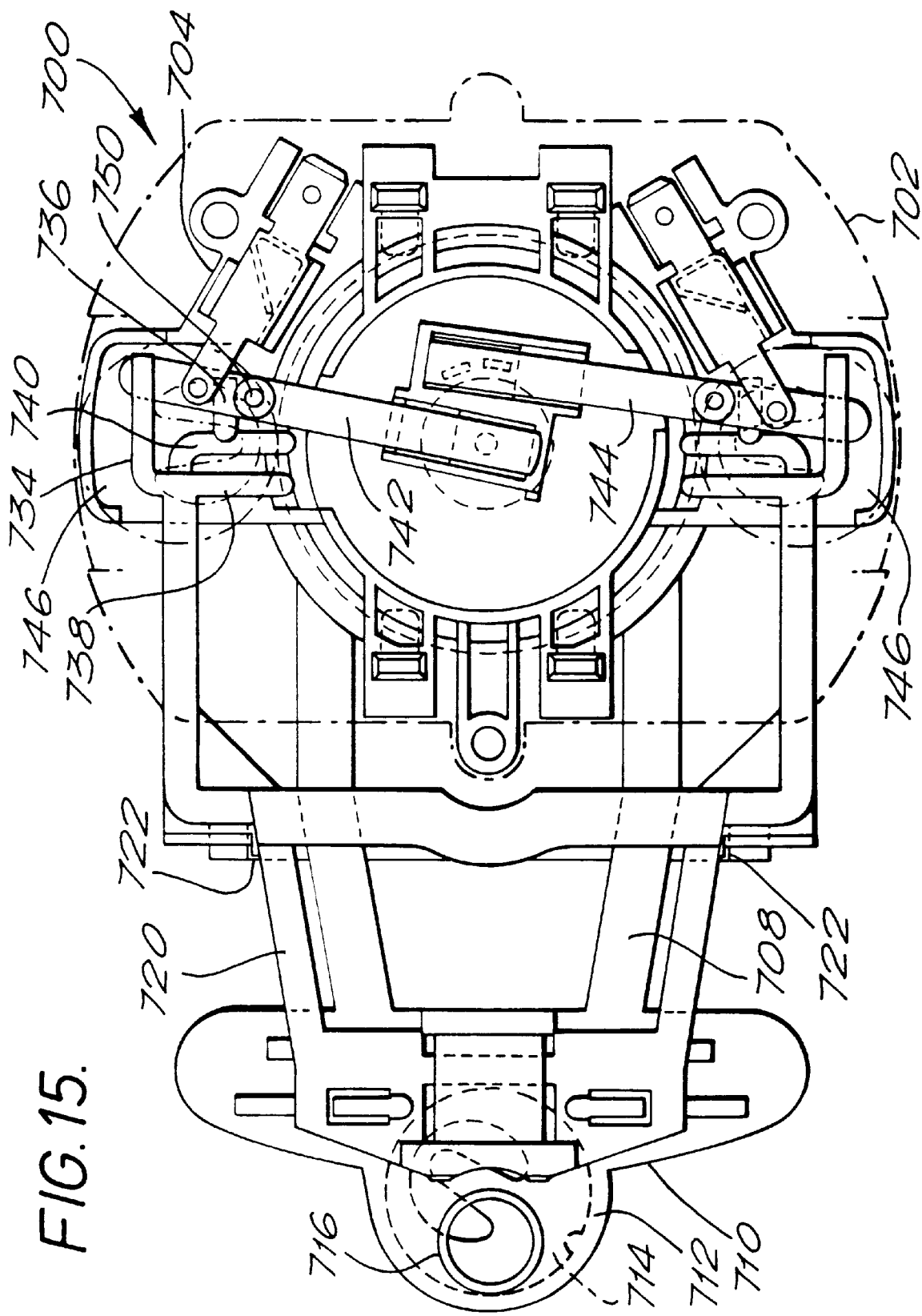
FIG. 15 shows a top plan view of a further embodiment of the invention.

FIGS. 15 and 16A and 16B show a further embodiment of the invention. This embodiment is a modification of the embodiment of FIGS. 12 and 13 to incorporate a boiling control and to allow for manual re-setting of the control.

Figure 12:
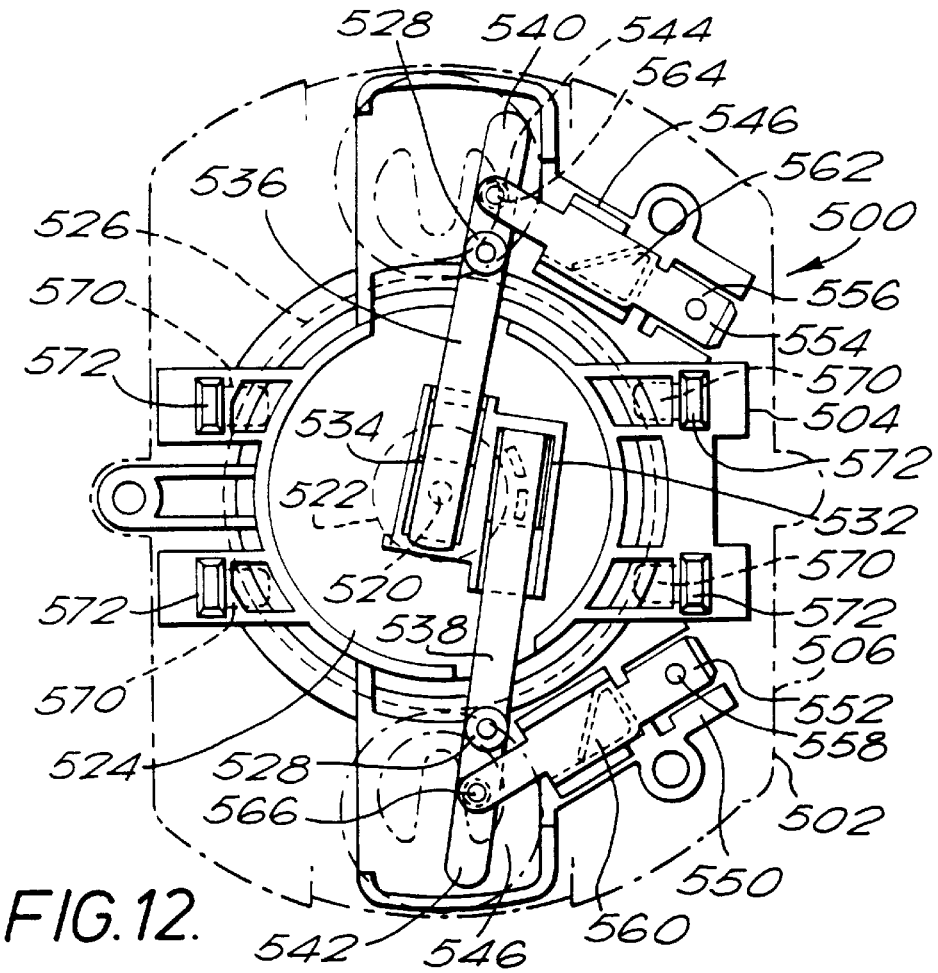
FIG. 12 shows a top plan view of further embodiment of the invention.
Figure 13:
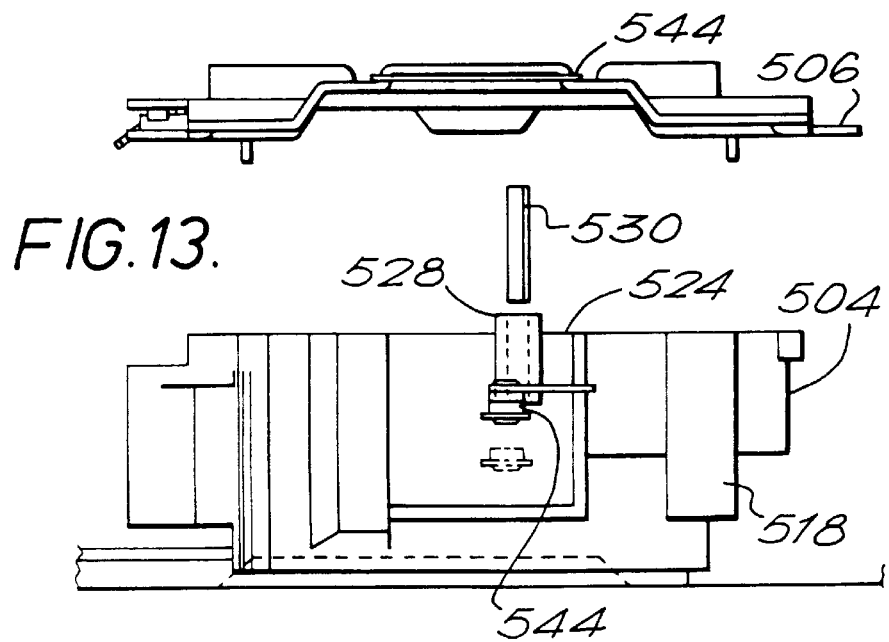
FIG. 13 shows a schematic, exploded side view of the embodiment of FIG. 12.
Figure 14:
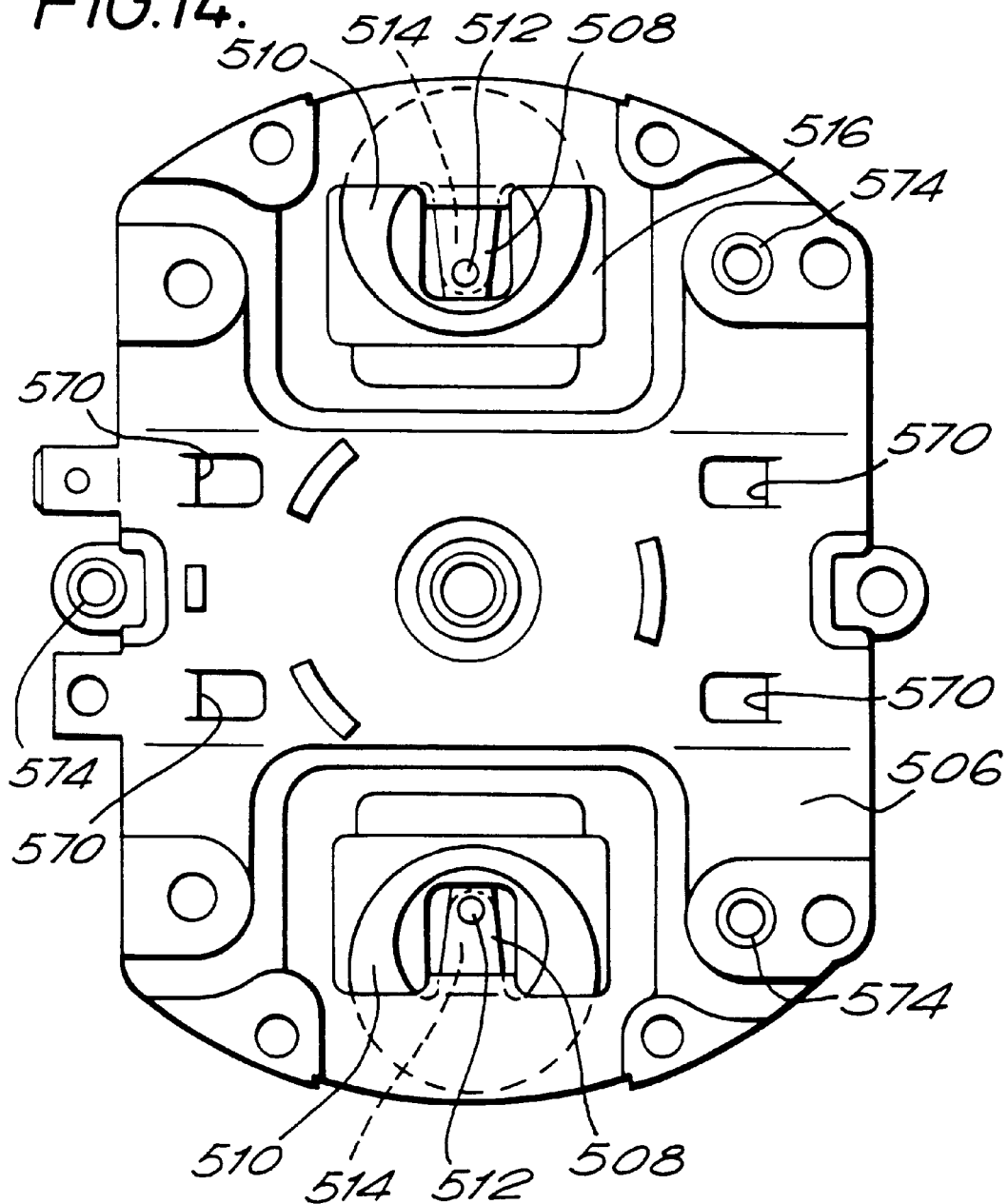
FIG. 14 shows a bottom plan view of a component of the embodiment of FIGS. 12 and 13.

The control 700 shown in FIGS. 15 and 16 comprises a carrier plate 702, which is exactly the same as that in the embodiment of FIGS. 12 and 13, and a cordless connector 704, substantially the same as that shown in that embodiment. The only significant modification to the connector 704 is that its moulding 706 has a lateral 'π' like extension 708.

The apex 710 of the extension 708 has a housing 712 for a bimetallic actuator 714 which, as will be described below is exposed to steam from the vessel. The top of the housing 712 is provided with a chimney 716 over which, in use engages a pipe 718 connected to a steam pipe (not shown) leading from the vessel, for example extending through the base of the vessel or along an external wall thereof.

The moulding 706 also mounts a spring loaded trip lever 720. The trip lever 720 is pivotally mounted in knife edges 722 provided in respective pillars 724 of the moulding 706, and is spring loaded by an over-centre C spring 726 which engages in respective mountings 728, 730 in the lever 720 and moulding 706. At the apex of the trip lever 720, there is a lug 732 which engages the bimetallic actuator 714. The other end of the lever is bifurcated and has a number of arms 734, 736, 738, 740 on the end of each bifurcated portion.

The arms 734, 736 are positioned so as to be engageable with the respective terminal strips 742, 744 of the connector 704. When the control is in the 'cocked' condition, ie. that shown in FIG. 16A, the arm 736 is positioned just below the terminal strip 742. The arm 734, however, lies over the top of the strip 742, as shown most clearly in FIG. 15.

When a bimetallic actuator 746 operates, it will, as in the earlier embodiment, push a push rod 750 downwardly to open the contacts by a small amount and thereby interrupt the electrical supply to the element of the vessel. However, during this downward motion, the strip 742 will engage the arm 736, moving it downwardly by an amount sufficient to pivot the trip lever 720 over centre with respect to the C spring 726. This will cause the trip lever to move to the fully open position shown in FIG. 16B, and in so doing, the arm 734 engages with the top of the terminal strip 742 to move it downwardly to give a full 3 mm minimum contact gap. In order to reset the control, it is necessary to recock the trip lever by pushing down on the end of the trip lever 720, for example by a lever attached to the end of the lever and extending out of the base compartment of the vessel.

It will be clear that this control will operate irrespective of which actuator 746 operates in the event of the vessel overheating. It will also operate if liquid in the vessel boils. In particular, if steam is conducted to the steam actuator 714, and this operates, it will move the trip lever 720 upwardly through the lug 732 to cause the lever 720 also to go over centre, and thus open the contacts by virtue of the arm 734 engaging the top of the strip 742.

Figure 17:
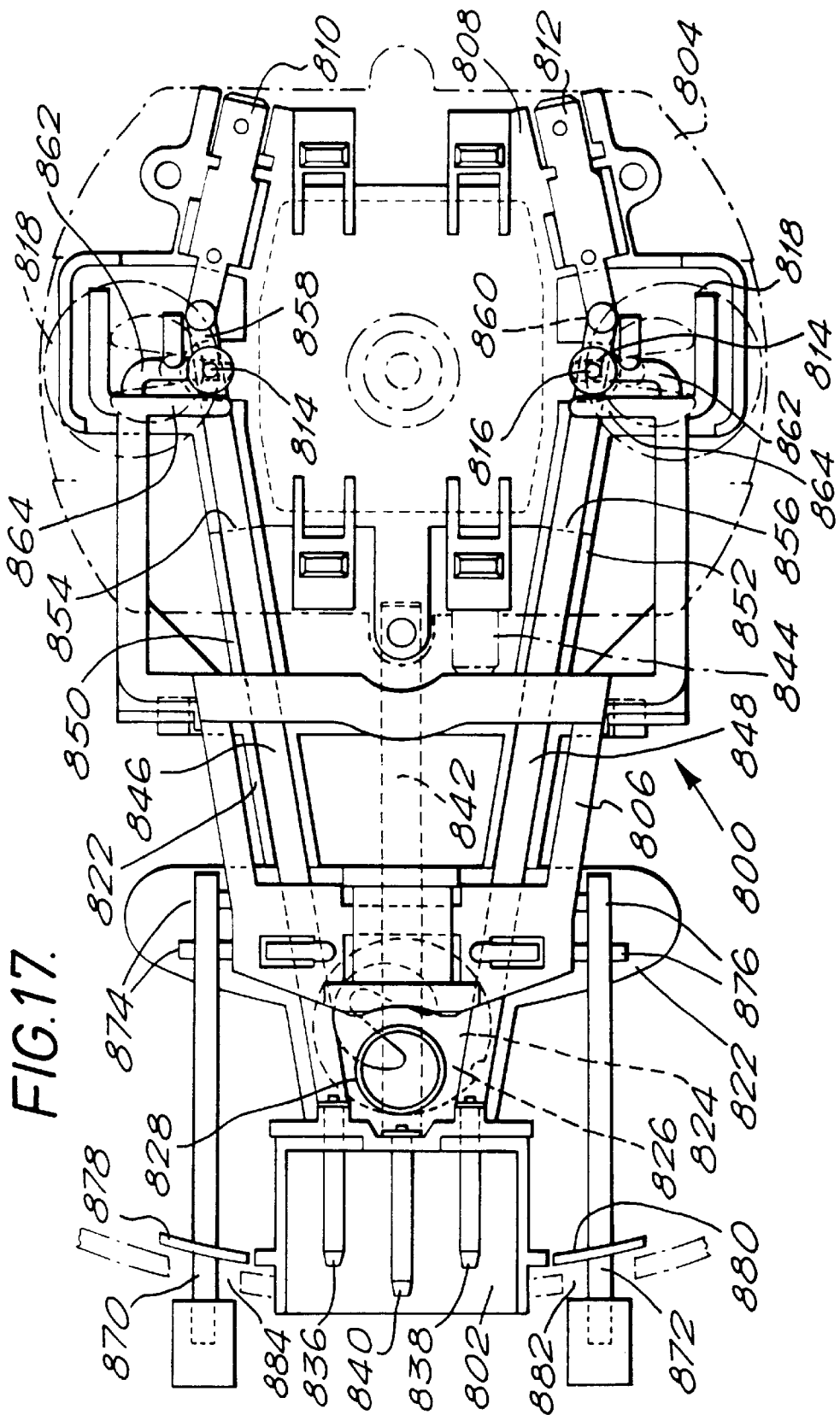
FIG. 17 shows a top plan view of a further embodiment of the invention.
Figure 18A:
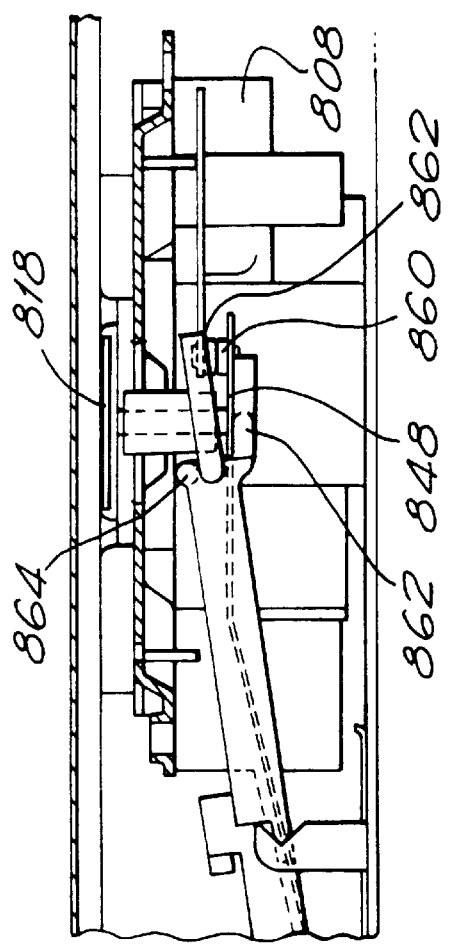
FIGS. 18A and 18B show schematic side views of the embodiment of FIG. 17 in different operating conditions.
Figure 18B:
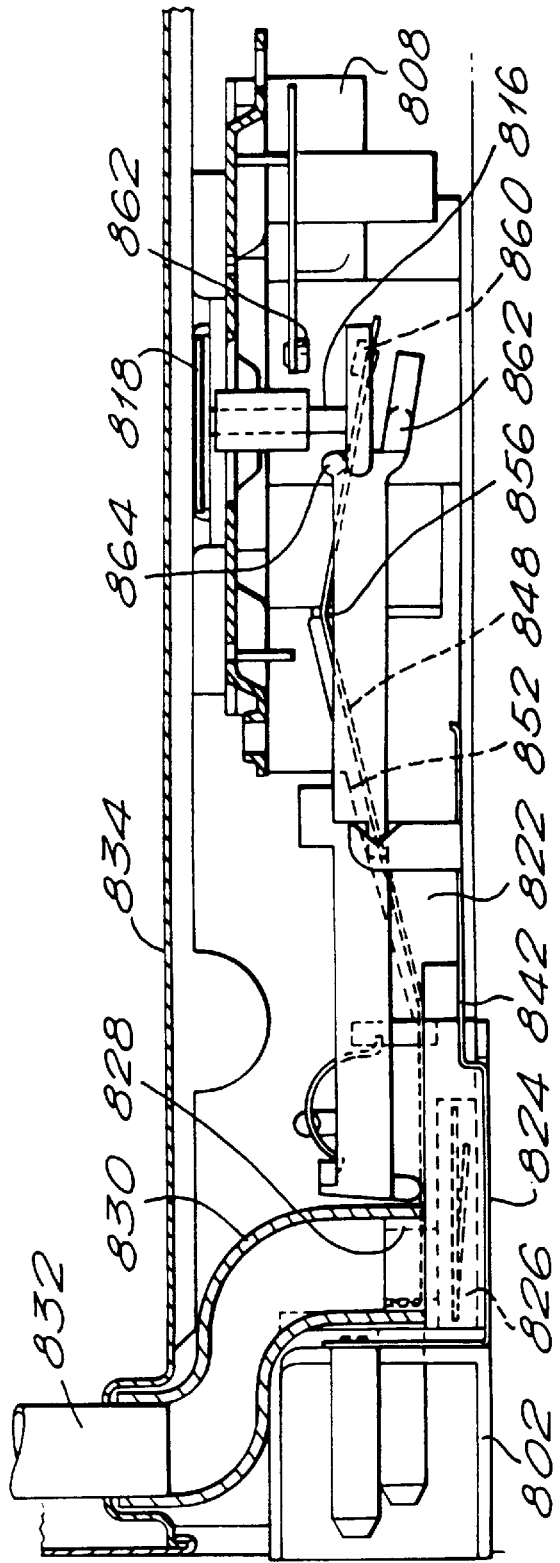

A yet further embodiment of the invention will now be described with reference to FIGS. 17 and 18A and 18B. This shows a control 800 suitable for use in 'corded' appliances where a pin inlet 802 is provided in a wall of the vessel, rather than a cordless connector as in the earlier embodiment.

This embodiment does, however, share a considerable number of common components with the earlier embodiment. In particular, it uses the same carrier plate 804 and trip lever 806 as in the earlier embodiment. In this embodiment, however, the moulding 808 is different from that in the earlier embodiment. The moulding 808 mounts terminals 810, 812 corresponding to those in the earlier embodiment, and also has bores 814 to receive respective push rods 816 for engagement with bimetallic actuators 818 as in the earlier embodiment. The moulding 808 is also mounted to the carrier plate 804 in the same way as earlier described.

The moulding 808 also has a generally 'π' shaped lateral extension 822 as in the earlier embodiment, and mounts the pin inlet housing moulding 802 at its apex.

As in the earlier embodiment, the moulding 802 locates a bimetallic actuator 824 in a housing 826, the housing having a chimney 828 on which engages a flexible steam pipe 830 which extends around the top of the pin inlet housing 802 to engage with a steam pipe 832 projecting through the base 834 of the vessel. A flexible pipe is particularly advantageous in this embodiment, since it allows the steam to be conducted effectively around the pin inlet in a confined space, as well as allowing production tolerances to be accommodated.

The inlet 802 house line, neutral and earth pins, 836, 838, 840. The earth pin 840 is connected to an earth spade 844 on the carrier plate 804 by a conductive strip 842 rivetted to the pin 840. Current is conducted from the line and neutral pins 836, 838 by respective conductive strips 846, 848. These strips 846, 848 run along and are clipped into respective channels 850, 852 provided in the upper surface of the moulding 808, and are bent over respective edges 850, 852 so as to be able to deflect at their free ends. Those ends mount respective contacts 858, 860 which engage with the contacts 862 provided on the respective terminals 810, 812 to conduct current to the element. The resilience of the strips 846, 848 will provide a contact pressure in the respective contact pairs.

The trip lever 806 is mounted on the moulding 808 in the same manner as in the earlier embodiment. The lever has the same arm configuration at its free end as in the earlier embodiment, but it is the other two arms which are used in the operation of the control. In particular, arm 862 is positioned to lie under the end of the respective strip 846, 848 and arm 864 is arranged to lie over it. Accordingly when one or other bimetallic actuator 818 operates in the event of the vessel base overheating, the end of the respective strip 846, 848 deflects downwardly to break the electrical contact in the contact pair, and in so doing picks up arm 862. This arm is moved sufficiently to cause the trip lever 806 to go over centre with respect to its C spring, thereby causing the further arm 864 to engage the top of the strip 846, 848 to open the contacts fully, as in the earlier embodiment and as shown in FIG. 18B. Similarly, when the steam bimetallic actuator operates, it will also cause the lever to trip, causing both arms 864 to engage with the respective strip 850, 852 to open the contacts.

To reset the mechanism as in the earlier embodiment, the trip lever 806 must be pushed down. This may be done by manipulating levers 870, 872 which may be clipped onto mounting spigots 874, 876 on the sides of the trip lever 806 and which project outside the vessel base, on either side of the pin inlet 802. Shields 878, 880 may be provided to close the openings 882, 884 on the vessel side wall through which the levers pass. These levers 870, 872 may be operated to reset the control after it has operated or used to trip the lever mechanism if it is desired to interrupt operation of the vessel at any point during operation.

Whilst it will be appreciated that whilst these embodiments have been described with reference to heating vessels having coiled heating elements attached to the base of the vessel, the invention also extends to other types of vessel with base heating, for example vessels having printed heating elements provided on their base.

I claim:

1. An integrated cordless electrical connector and thermally sensitive control unit for mounting beneath a base of a water receiving container of a water boiling vessel, the base being provided with an electric heating element, the integrated connector and control unit comprising:

a cordless electrical connector of a type engageable with a corresponding connector part irrespective of their relative angular orientation;

a pair of thermally sensitive bimetallic actuators arranged at spaced apart locations on a face of the control unit at respective locations each spaced laterally from a central axis of the connector, the actuators being arranged to make good thermal contact with the base or element such that temperature can be sensed effectively by the respective actuators at spaced apart locations on the base or element in use; and electrical switch contacts associated with each of the actuators and operatively coupled thereto by respective coupling means, the switch contacts and their associated coupling means being arranged to a side of the cordless connector, such arrangement being such that the actuators can each operate independently of the other in use to open the associated contacts and interrupt a power supply to the element of the vessel when overheating occurs due to the vessel being switched on dry or boiling dry, but neither operates in normal boiling operation of the vessel.

2. A unit as claimed in claim 1 wherein said coupling means comprise push rods.

3. A unit as claimed in claim 1 wherein said connector comprises a plurality of concentric terminal members.

4. A unit as claimed in claim 1 comprising a plastics moulding mounting components of said connector and said switch contacts.

5. A unit as claimed in claim 2 comprising a plastics moulding mounting components of said connector and said switch contacts.

6. A unit as claimed in claim 3 comprising a plastics moulding mounting components of said connector and said switch contacts.

7. A unit as claimed in claim 4 wherein said bimetallic actuators are mounted on a plate which is mounted to said plastics moulding.

8. A unit as claimed in claim 5 wherein said bimetallic actuators are mounted on a plate which is mounted to said plastics moulding.

9. A unit as claimed in claim 6 wherein said bimetallic actuators are mounted on a plate which is mounted to said plastics moulding.

10. A unit as claimed in claim 1 wherein said actuators are arranged on opposed sides of the connector.

11. A unit as claimed in claim 9 wherein said actuators are arranged on opposed sides of the connector.

12. A unit as claimed in claim 1 wherein said actuators operate at substantially a same temperature.

13. A unit as claimed in claim 4 wherein said actuators operate at substantially a same temperature.

14. A unit as claimed in claim 9 wherein said actuators operate at substantially a same temperature.

15. A unit as claimed in claim 1 wherein the respective sets of switch contacts are arranged in respective poles of the supply to the heating element.

16. A unit as claimed in claim 1 wherein operation of either actuator opens both sets of contacts.

17. A unit as claimed in claim 1 wherein said actuators operate to trip a spring loaded mechanism which maintains a set of contacts open until reset by a user.

18. A unit as claimed in claim 4 wherein said actuators operate to trip a spring loaded mechanism which maintains a set of contacts open until reset by a user.

19. A unit as claimed in claim 9 wherein said actuators operate to trip a spring loaded mechanism which maintains a set of contacts open until reset by a user.

20. A unit as claimed in claim 17 wherein said spring loaded mechanism comprises a trip lever pivotally mounted to said unit and having a first arm acted upon in response to operation of said actuators to trip the lever, and a second arm for further opening the contacts when the lever is tripped.

21. A unit as claimed in claim 1 further comprising a manually resettable boiling control.

22. A unit as claimed in claim 21 wherein said boiling control acts to open the same contacts as one or both of said bimetallic actuators.

23. A unit as claimed in claim 22 wherein said boiling control trips a spring loaded mechanism which maintains a set of contacts open until reset by a user, said spring loaded mechanism comprising a trip lever pivotally mounted to said unit and having a first arm acted upon in response to operation of said actuators to trip the lever, and a second arm for further opening the contacts when the lever is tripped.

24. A unit as claimed in claim 23 wherein said boiling control comprises a bimetallic actuator which acts on an end of said trip lever remote from the said arms acted upon by the thermally sensitive actuators.

25. An integrated cordless electrical connector and thermally sensitive control unit for mounting beneath a base of a water receiving container of a water boiling vessel, the base being provided with an electric heating element, the integrated connector and control unit comprising:

a cordless electrical connector of a type engageable with a corresponding connector part irrespective of their relative angular orientation;

a pair of thermally sensitive bimetallic actuators arranged at spaced apart locations on a face of the control unit at respective locations each spaced laterally from a central axis of the connector, the actuators being arranged to make good thermal contact with the base or element such that temperature can be sensed effectively by the respective actuators at spaced apart locations on the base or element in use, and operable at substantially a same temperature;

electrical switch contacts associated with each of the actuators and operatively coupled thereto by respective push rod coupling means, the switch contacts and their associated coupling means being arranged to a side of the cordless connector, such arrangement being such that the actuators can each operate independently of the other in use to open the associated contacts and interrupt a power supply to the element of the vessel when overheating occurs due to the vessel being switched on dry or boiling dry, but neither operates in normal boiling operation of the vessel.

26. A unit as claimed in claim 5 wherein said connector comprises a plurality of concentric terminal members.

27. A unit as claimed in claim 26 wherein said actuators are mounted on a plate mounted to a plastics moulded housing of the unit.

28. A liquid heating vessel comprising a water receiving container having a base provided with an electric heating element and an integrated cordless electrical connector and thermally sensitive control unit mounting beneath the base of the water receiving container such that bimetallic actuators of said unit are arranged in good thermal contact with spaced apart locations on the base or element, the integrated connector and control unit comprising:

a cordless electrical connector of a type engageable with a corresponding connector part irrespective of their relative angular orientation;

a pair of thermally sensitive bimetallic actuators arranged at spaced apart locations on a face of the control unit at respective locations each spaced laterally from a central axis of the connector, the actuators being arranged to make good thermal contact with the base or element such that temperature can be sensed effectively by the respective actuators at spaced apart locations on the base or element in use; and electrical switch contacts associated with each of the actuators and operatively coupled thereto by respective coupling means, the switch contacts and their associated coupling means being arranged to a side of the cordless connector, the respective switch contacts being arranged in respective lines of an electrical supply to the element of the vessel, such arrangement being such that the actuators can each operate independently of the other in use to open the associated contacts and interrupt a power supply to the element of the vessel when overheating occurs due to the vessel being switched on dry or boiling dry, but neither operates in normal boiling operation of the vessel.

29. A water heating vessel as claimed in claim 28 further comprising a base unit for receiving the vessel, said base unit having, on an upper surface thereof, an electrical connector for engagement with the corresponding electrical connector of the control unit.

30. A water heating vessel as claimed in claim 29 wherein said heating element is a sheathed heating element mounted to an underside of the vessel base.

31. A water heating vessel as claimed in claim 29 wherein said heating element is a printed heating element provided on the vessel base.

32. An integrated, thermally sensitive, overheat protection control unit for mounting in thermal contact with an electrically heated base of a liquid receiving container of a water boiling vessel, the control unit comprising:

a moulded plastics control body;

a pair of spaced apart, thermally sensitive, resettable, overheat protection bimetallic actuators arranged at spaced apart locations on a face of the control body for making equally good thermal contact with the base in use and operable when an element of the vessel overheats due to the vessel being switched on dry or boiling dry, but not during normal boiling operation of the vessel; and two sets of switch contacts provided in the control body, each set being associated with a respective actuator and openable by its respective actuator when that actuator operates so as to interrupt a supply of energy to the element of the vessel, said actuators being intended to operate at substantially a same temperature.

33. A unit as claimed in claim 32 wherein said bimetallic actuators are mounted on a plate which is mounted to the control body.

34. A unit as claimed in claim 32 wherein said actuators are arranged on a peripheral portion of the control unit.

35. A unit as claimed in claim 31 wherein said respective sets of contacts are arranged in respective poles of the supply to the element.

36. A unit as claimed in claim 31 wherein operation of either actuator opens both sets of contacts.

37. A unit as claimed in claim 31 wherein said actuators operate to trip a spring loaded mechanism which maintains a set of contacts open until reset by a user.

38. A unit as claimed in claim 37 wherein said spring loaded mechanism comprises a trip lever pivotally mounted to said control body and having a first arm acted upon in response to operation of said actuators to trip the lever, and a second arm for further opening the contacts when the lever is tripped.

39. A unit as claimed in claim 32 further comprising a cordless electrical connector for engagement in use with a power supply for the heater.

40. A unit as claimed in claim 32 further comprising a manually resettable boiling control.

41. A unit as claimed in claim 40 wherein said boiling control acts to open the same contacts as said thermally sensitive actuators.

42. A unit as claimed in claim 41 wherein said boiling control trips a spring loaded mechanism.

43. A unit as claimed in claim 42 wherein said spring loaded mechanism comprises a trip lever pivotally mounted to said control body and having a first arm acted upon in response to operation of said actuators to trip the lever, and a second arm for further opening the contacts when the lever is tripped, and the boiling control acts on an end of said trip lever remote from the arms acted upon by the thermally sensitive actuators.

44. An integrated, thermally sensitive, overheat protection control unit for mounting in thermal contact with an electrically heated base of a liquid receiving container of a water boiling vessel, the control unit comprising:

a moulded plastics control body;

a pair of spaced apart, thermally sensitive, resettable, overheat protection bimetallic actuators arranged peripherally on the control unit at spaced apart locations on a face of the control body for making equally good thermal contact with the base in use and operable when an element of the vessel overheats due to the vessel being switched on dry or boiling dry, but not during normal boiling operation of the vessel; and two sets of switch contacts provided in the control body, each set being associated with a respective actuator, arranged in a respective pole of an electrical supply to the element of the vessel and openable by its respective actuator when that actuator operates so as to interrupt a supply of energy to the element of the vessel, said actuators being intended to operate at substantially a same temperature.

45. A water boiling vessel comprising a water receiving container having an electrically heated base and an integrated, thermally sensitive, overheat protection control unit, which control unit comprises:

a moulded plastics control body;

a pair of spaced apart, thermally sensitive, resettable, overheat protection bimetallic actuators arranged peripherally on the control unit at spaced apart locations on a face of the control body for making equally good thermal contact with the base in use and operable when an element of the vessel overheats due to the vessel being switched on dry or boiling dry, but not during normal boiling operation of the vessel;

two sets of switch contacts provided in the control body, each set being associated with a respective actuator, arranged in a respective pole of an electrical supply to the element of the vessel and openable by its respective actuator when that actuator operates so as to interrupt a supply of energy to the element of the vessel, said actuators being intended to operate at substantially a same temperature, said unit being mounted in good thermal contact with an underside of the base of the water receiving container of the vessel.

46. A water boiling vessel as claimed in claim 45 further comprising boiling control means operable when liquid in the vessel boils, to interrupt a supply of energy to the element.

47. A water boiling vessel as claimed in claim 46 wherein said boiling control means is a part of the control unit.

48. A water boiling vessel as claimed in claim 45 wherein the base of the water receiving container is provided with a sheathed heating element extending circumferentially thereon, and the control unit is positioned radially inwardly of the element.

49. A water boiling vessel as claimed in claim 45 wherein the base of the water receiving vessel is provided with a printed heating element.

* * * * *